US012513054B2

(12) United States Patent
Kuwahara

(10) Patent No.: US 12,513,054 B2
(45) Date of Patent: Dec. 30, 2025

(54) SYSTEM CONFIGURATION DERIVATION DEVICE, SYSTEM CONFIGURATION DERIVATION METHOD, AND COMPUTER-READABLE MEDIUM

(71) Applicant: NEC Corporation, Tokyo (JP)

(72) Inventor: Takuya Kuwahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/685,555

(22) PCT Filed: Sep. 10, 2021

(86) PCT No.: PCT/JP2021/033367
§ 371 (c)(1),
(2) Date: Feb. 22, 2024

(87) PCT Pub. No.: WO2023/037506
PCT Pub. Date: Mar. 16, 2023

(65) Prior Publication Data
US 2024/0396806 A1    Nov. 28, 2024

(51) Int. Cl.
*H04L 41/14* (2022.01)
(52) U.S. Cl.
CPC ................... *H04L 41/145* (2013.01)
(58) Field of Classification Search
None
See application file for complete search history.

(56) References Cited

U.S. PATENT DOCUMENTS 11,265,224 B1* 3/2022 Bogado ................. H04L 41/40
2010/0332444 A1* 12/2010 Akatsu .................. G06N 5/025
706/54

(Continued)

FOREIGN PATENT DOCUMENTS

JP    H06-90235 A     3/1994
JP    2011-013750    1/2011
(Continued)

OTHER PUBLICATIONS

International Search Report for PCT Application No. PCT/JP2021/033367, mailed on Nov. 30, 2021.

(Continued)

*Primary Examiner* — Fadi Haj Said
(74) *Attorney, Agent, or Firm* — Sughrue Mion, PLLC

(57) ABSTRACT

A system configuration derivation device (300) according to the present disclosure includes: a concretizing policy specifying unit (302) configured to specify, from among concretizing actions, which correspond to concrete conversion of an abstract configuration by concretizing rules, a concretizing action that it is essential to apply to the input abstract configuration; a comprehensiveness verification unit (303) configured to verify whether or not the essential concretizing action capable of removing abstract elements included in the input abstract configuration can be applied comprehensively to the input abstract configuration; and a configuration information concretizing unit (301) configured to apply the essential concretizing action specified by the concretizing policy specifying unit (302) based on the result of the verification performed by the comprehensiveness verification unit (303), thereby converting the input abstract configuration to a more concrete abstract configuration until the abstract configuration no longer includes abstract elements.

8 Claims, 18 Drawing Sheets

(56) References Cited

U.S. PATENT DOCUMENTS

| | | | | |
|---|---|---|---|---|
| 2014/0007070 | A1* | 1/2014 | Huang | G06F 8/65 |
| | | | | 717/170 |
| 2016/0246582 | A1* | 8/2016 | Benton | G06F 8/61 |
| 2017/0339251 | A1* | 11/2017 | Jagannath | H04L 41/0246 |
| 2019/0377463 | A1* | 12/2019 | Fletcher | H04L 41/22 |
| 2021/0240448 | A1* | 8/2021 | Kuroda | G06F 8/35 |

FOREIGN PATENT DOCUMENTS

| | | |
|---|---|---|
| WO | 2013072978 A1 | 5/2013 |
| WO | 2019/216082 | 11/2019 |

OTHER PUBLICATIONS

Takayuki Kuroda, Takuya Kuwahara, Takashi Maruyama, Kozo Satoda, Hideyuki Shimonishi, Takao Osaki and Katsushi Matsuda, "Weaver: A Novel Configuration Designer for IT/NW Services in Heterogeneous Environments", 2019 IEEE Global Communications Conference (GLOBECOM), 2019, pp. 1-6.

Doron Peled, "All from One, One for All: on Model Checking Using Representatives", 5th International Conference on Computer Aided Verification (CAV), 1993, pp. 409-423.

Harmen Kastenberg, Arend Rensink, "Dynamic Partial Order Reduction Using Probe Sets", 19th International Conference on Concurrency Theory (CONCUR), 2008, pp. 233-247.

Yakuwa, Yutaka et al., Efficient Reinforcement learning for Automation of ICT System Design, IPSJ Technical Reports: Mathematical Modeling and Problem Solving, vol. 2020-MPS-128, No. 11, Jun. 22, 2020, pp. 1-8<URL: https://ipsj.ixsq.nii.ac.jp/ej/?action=repository_url&item_id=206053&file_id=1&file_no=1>.

Yamamoto, Mitsuharu et al., Evolution of Graph Search Algorithms and Their Verification, Computer Software, vol. 18-0(2001), Feb. 28, 2001, pp. 92-108, DOI: https://doi.org/10.11309/jssst.18.92.

* cited by examiner

SYSTEM CONFIGURATION DERIVATION DEVICE, SYSTEM CONFIGURATION DERIVATION METHOD, AND COMPUTER-READABLE MEDIUM

This application is a National Stage Entry of PCT/JP2021/033367 filed on Sep. 10, 2021, the contents of all of which are incorporated herein by reference, in their entirety.

TECHNICAL FIELD

The present disclosure relates to a system configuration derivation device, a system configuration derivation method, and a computer-readable medium.

BACKGROUND ART

Work required when building an Information and Communication Technology (ICT) system for the purpose of service operations and the like includes system configuration design work and deployment procedures design work.

Among them, in particular, the system configuration design work requires that components of the system and their connection relationships (hereinafter these components and the connection relationships will be collectively referred to as a "system configuration") required to meet requirements required for a desired system (hereinafter these requirements will be referred to as "system requirements") be constructed without shortage, and that all the necessary settings must be set correctly for the entire system to work properly. This work is a very labor-intensive task in some cases.

Techniques for automating the aforementioned design process, i.e., the process of concretizing system requirements to system configuration, are automatic design techniques. Existing automatic design techniques often narrow down the design target to a specific domain of the ICT system such as network paths, placement of computational resources, and the like, and perform automatic design by solving some kind of optimization problem. Recently, on the other hand, research is also underway on techniques for dealing with generic descriptions of requirements.

For example, Non-Patent Literature 1 describes a technique for automatically deriving a system configuration based on a requirement described using a generic system configuration information model by a graph-like format. According to the automatic design method disclosed in Non-Patent Literature 1, it is possible to automatically design a system with generic and multifaceted system requirements as input by preparing the necessary models.

In requirements that can be described by the generic model disclosed in Non-Patent Literature 1, functions and components such as devices are mainly represented as nodes and the relationships between the nodes are specified by a graphical representation with edges (directed edges) (hereinafter this configuration will be referred to as an "abstract configuration"). For example, a requirement that "Transmission Control Protocol (TCP) communication is possible between two servers" is expressed as an abstract configuration in which nodes that correspond to two servers are connected by an edge representing "TCP communication possible". The technique disclosed in Non-Patent Literature 1, for example, automatically derives a way to concretize the abstract "TCP communication possible" edges included in the aforementioned abstract configuration.

It should be noted that the automatic design method disclosed in Non-Patent Literature 1 does not concretize given requirements all at the same time. In the automatic design method disclosed in Non-Patent Literature 1, rules for rewriting an abstract configuration with another abstract configuration which is more concrete than the former one by one step (hereinafter the rules will be referred to as "concretizing rules") are held as data, and the concretizing rules are sequentially applied to the abstract configuration representing requirements, thereby converting the abstract configuration into a concrete abstract configuration in a step-by-step manner.

CITATION LIST

Patent Literature

[Patent Literature 1] Japanese Unexamined Patent Application Publication No. H06-090235
[Patent Literature 2] International Patent Publication No. WO 2013/072978

Non-Patent Literature

[Non-Patent Literature 1] Takayuki Kuroda, Takuya Kuwahara, Takashi Maruyama, Kozo Satoda, Hideyuki Shimonishi, Takao Osaki and Katsushi Matsuda, "Weaver: A Novel Configuration Designer for IT/NW Services in Heterogeneous Environments", 2019 IEEE Global Communications Conference (GLOBECOM), 2019, pp. 1-6.
[Non-Patent Literature 2] Doron Peled, "All from One, One for All: on Model Checking Using Representatives", 5th International Conference on Computer Aided Verification (CAV), 1993, pp. 409-423.
[Non-Patent Literature 3] Harmen Kastenberg, Arend Rensink, "Dynamic Partial Order Reduction Using Probe Sets", 19th International Conference on Concurrency Theory (CONCUR), 2008, pp. 233247.

SUMMARY OF INVENTION

Technical Problem

However, there is a problem in the automatic design method disclosed in Non-Patent Literature 1 that it is impossible to efficiently find a concrete configuration in which system requirements are concretized.

The present disclosure has been made in order to solve the aforementioned problem, and an aim of the present disclosure is to provide a system configuration derivation device, a system configuration derivation method, and a computer-readable medium capable of efficiently deriving a concrete configuration in which system requirements are concretized.

Solution to Problem

A system configuration derivation device according to one aspect is a system configuration derivation device configured to derive a concretized system by repeating processing of receiving, by a graph-like data structure formed of nodes that correspond to components and edges indicating relationships among the components, an abstract configuration that expresses a configuration of a system including an undetermined abstract element as input, generating a search tree having the input abstract configuration as a root, converting the input abstract configuration into a more concrete abstract configuration by applying a concretizing rule which describes a method for removing the abstract element included in the abstract configuration, and adding the abstract configuration obtained by the conversion to the search tree, the system configuration derivation device including: a concretizing policy specifying unit configured to specify a concretizing action that it is essential to apply to the input abstract configuration from among concretizing actions, which correspond to concrete conversion of the abstract configuration by the concretizing rule; a comprehensiveness verification unit configured to verify whether the essential concretizing action capable of removing the abstract element included in the input abstract configuration can be applied comprehensively to the input abstract configuration; and a configuration information concretizing unit configured to apply the essential concretizing action specified by the concretizing policy specifying unit based on the result of the verification performed by the comprehensiveness verification unit, thereby converting the input abstract configuration into a more concrete abstract configuration until the abstract configuration no longer includes abstract elements.

A system configuration derivation method according to one aspect is a system configuration derivation method performed by a system configuration derivation device that derives a concretized system by repeating processing of receiving, by a graph-like data structure formed of nodes that correspond to components and edges indicating relationships among the components, an abstract configuration that expresses a configuration of a system including an undetermined abstract element as input, generating a search tree having the input abstract configuration as a root, converting the input abstract configuration into a more concrete abstract configuration by applying a concretizing rule which describes a method for removing the abstract element included in the abstract configuration, and adding the abstract configuration obtained by the conversion to the search tree, the system configuration derivation method including: a first step of specifying a concretizing action that it is essential to apply to the input abstract configuration from among concretizing actions, which correspond to concrete conversion of the abstract configuration by the concretizing rule; a second step of verifying whether or not the essential concretizing action capable of removing the abstract element included in the input abstract configuration can be applied comprehensively to the input abstract configuration; and a third step of applying the essential concretizing action specified in the first step based on the result of the verification in the second step, thereby converting the input abstract configuration into a more concrete abstract configuration until the abstract configuration no longer includes abstract elements.

A computer-readable medium according to one aspect is a non-transitory computer readable medium storing a program for causing a computer to derive a concretized system by repeating processing of receiving, by a graph-like data structure formed of nodes that correspond to components and edges indicating relationships among the components, an abstract configuration that expresses a configuration of a system including an undetermined abstract element as input, generating a search tree having the input abstract configuration as a root, converting the input abstract configuration into a more concrete abstract configuration by applying a concretizing rule which describes a method for removing the abstract element included in the abstract configuration, and adding the abstract configuration obtained by the conversion to the search tree, in which the program includes: a first procedure for specifying a concretizing action that it is essential to apply to the input abstract configuration from among concretizing actions, which correspond to concrete conversion of the abstract configuration by the concretizing rule; a second procedure for verifying whether or not the essential concretizing action capable of removing the abstract element included in the input abstract configuration can be applied comprehensively to the input abstract configuration; and a third procedure for applying the essential concretizing action specified in the first procedure based on the result of the verification in the second procedure, thereby converting the input abstract configuration into a more concrete abstract configuration until the abstract configuration no longer includes abstract elements.

Advantageous Effects of Invention

According to the aforementioned aspects, it is possible to provide a system configuration derivation device, a system configuration derivation method, and a computer-readable medium capable of efficiently deriving a concrete configuration in which system requirements are concretized.

EXAMPLE EMBODIMENT

Figure 1:
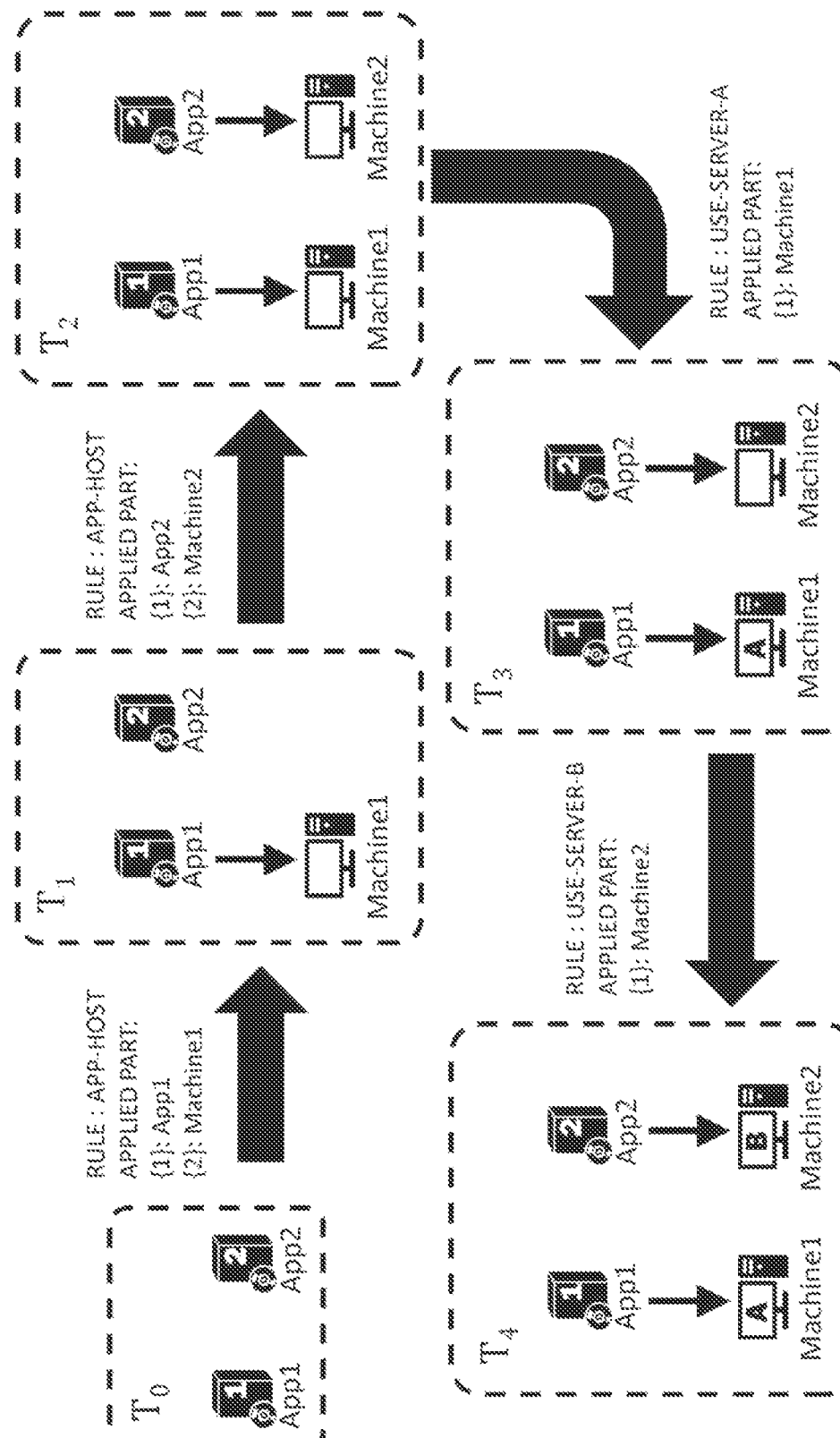
FIG. 1 is an explanatory diagram showing an example of a concretizing path.

Hereinafter, with reference to the drawings, related art and example embodiments of the present disclosure will be described. Note that the following descriptions and the drawings are omitted and simplified as appropriate for the sake of clarification of the description. Further, throughout the drawings, the same elements are denoted by the same reference symbols and redundant descriptions will be omitted as appropriate.

Related Art

Before describing example embodiments of the present disclosure, art related to the present disclosure will be described first.

An abstract configuration includes an element that is abstract (hereinafter this element is called an "abstract element"). A concretizing rule is data which specifically describes a method for converting an abstract element included in an abstract configuration into another component that is more concrete (hereinafter this conversion is called "an abstract element is solved"). Formally speaking, the concretizing rule, which is data that defines a method for solving an abstract element by converting an abstract configuration, is formed of two pieces of data, which is a graph having a form the same as that of the abstract configuration (hereinafter, these two pieces of data are referred to as "the left side" and "the right side").

Applying a concretizing rule to an abstract configuration is called executing a "concretizing action" on the abstract configuration. The "concretizing action" is formally data formed of two pieces of information, that is, a "concretizing rule" and an "applied part". When the structure that corresponds to the left side of the concretizing rule R exists as a substructure of an abstract configuration T, the concretizing rule R "can be applied" to the abstract configuration T. At this time, the correspondence relationship between "the left side or the right side of the concretizing rule" and "the substructure of the abstract configuration" is called an "applied part" in this application.

When the concretizing action formed of a concretizing rule R and an applied part M is executed on an abstract configuration T, the substructure of T corresponding to M is replaced by a structure that corresponds to the right side of R. At this time, the structure that is not included in the left side and is included in the right side can be newly created. However, if a structure that corresponds to the above structure has already been included in an abstract configuration of the application destination, this can be used as a part of the structure on the right side at the time of substitution of the structure.

It can be considered that, if it is possible to obtain, by applying a concretizing rule, an abstract configuration in which all the abstract elements included in a requirement are solved, this abstract configuration is a completely concretized system configuration (hereinafter this configuration will be referred to as a "concrete configuration") where there are no abstract elements.

Therefore, a concrete configuration is reachable by sequentially applying concretizing rules for concretizing abstract elements included in this abstract configuration to the abstract configuration given as a requirement. However, since there are generally a plurality of kinds of concretizing rules that solve a single abstract element, there emerge alternatives as to which concretizing rule should be used to solve each abstract element. Further, since each concretizing rule has conditions for applicability to the abstract configuration, it is possible that, even when there remains an abstract element in the abstract configuration, there are no means for solving this abstract element.

Therefore, in the automatic design process, it is required to "search" and find a concrete configuration while generating a tree structure having abstract configurations as nodes and application of concretizing rules as branches (hereinafter, this tree structure will be simply called a "search tree"). In general, the larger, more complex, and harder to satisfy requirements, the harder it is to reach the concrete configuration and the longer it takes to find it.

Hereinafter, a problem of related art will be described. The present disclosure relates to a technique for performing a generic system automatic design, like in Non-Patent Literature 1 which relates to a generic system automatic design technique.

According to the automatic design method disclosed in Patent Literature 1, models of necessary components are serviced, and these models are combined with each other, and a system requirement is specified as an abstract configuration. Then, it is possible to perform automatic design by applying predefined concretizing rules.

As already described above, by the "application" of the aforementioned concretizing rules, an abstract element included in an abstract configuration can be solved. Therefore, by repeatedly applying "application" of the concretizing rules, it is possible to perform search where the abstract configuration is set as a state space, thereby obtaining a concrete configuration in which all the abstract elements included in the abstract configuration are solved.

However, according to Non-Patent Literature 1, there remains a problem that, when the size of the graph specified as a requirement is large as a result of evaluation of a computation time that is required to complete the automatic design by an experiment, the computation time rapidly increases in proportion to the size of the graph.

One of the major causes of the rapid increase in the computation time is that a plurality of paths formed of a combination of exactly the same concretizing rules are searched in a redundant manner. In the following description, this will be explained using specific examples.

Figure 2:
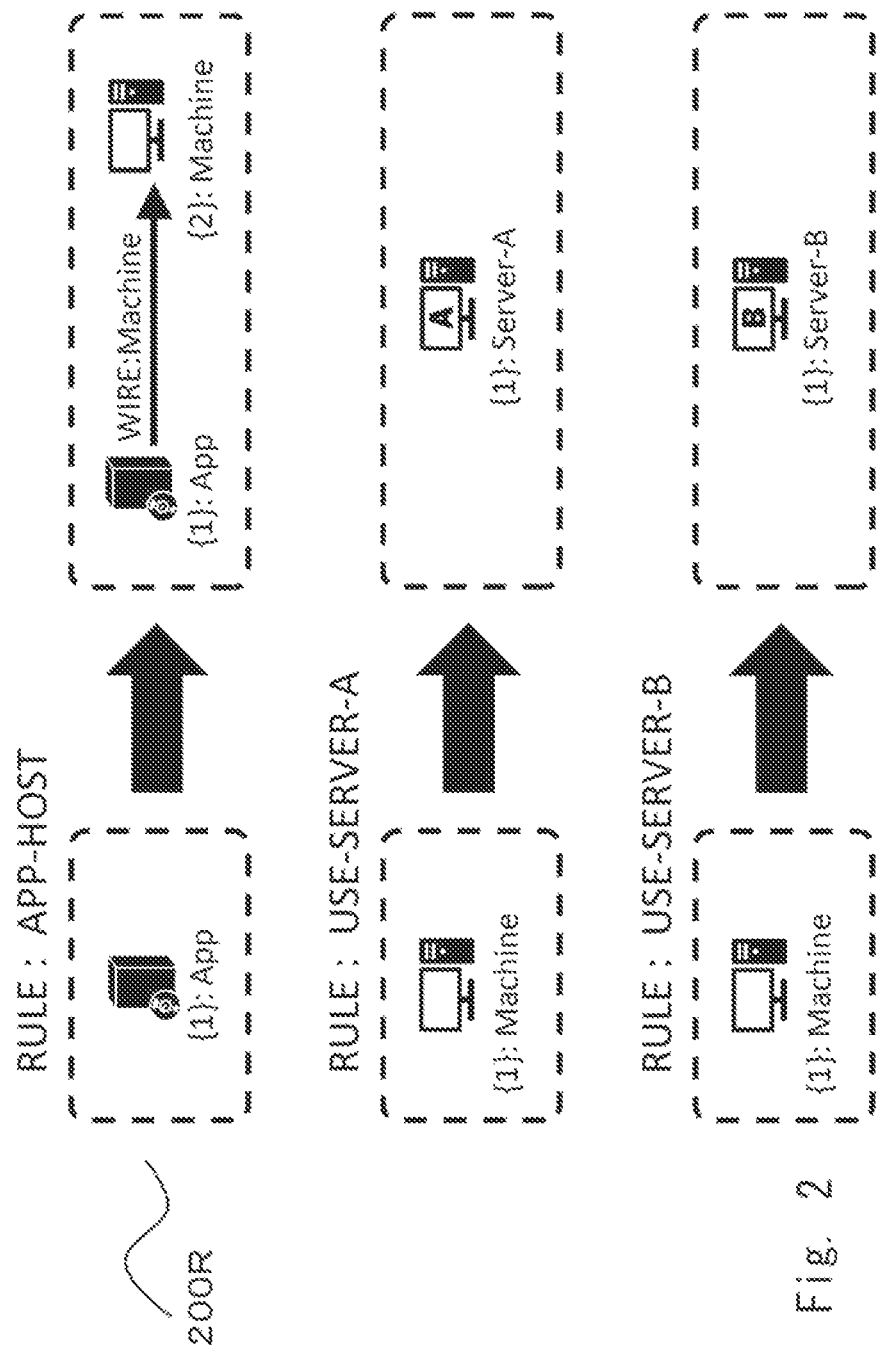
FIG. 2 is an explanatory diagram showing an example of concretizing rules.

FIG. 1 is an explanatory diagram showing application of a series of concretizing rules for causing two applications App1 and App2 whose types are the same to be hosted on respective machines and determining, for each of these machines, the product of the server. The dotted rounded-corner squares (and graphs surrounded by them) indicate abstract configurations, and arrows (and labels attached thereto) indicate application of concretizing rules. FIG. 1 includes five abstract configurations including $T_0$, which is a requirement, and $T_4$, which is a concrete configuration. It is assumed here that three concretizing rules APP-HOST, USE-SERVER-A, and USE-SERVER-B shown in FIG. 2 are registered as available concretizing rules. It is further assumed that the applications App1 and App2 can be hosted on either one of servers A and B but they cannot be hosted on two or more applications at the same time.

Based on the aforementioned assumption, configurations that are reachable from the requirement $T_0$ as a result of execution of concretizing actions are limited to, besides the configuration indicated by the concrete configuration $T_4$, a configuration in which the type of the server is changed from the configuration indicated by the concrete configuration $T_4$. That is, the configurations that are reachable from the requirement $T_0$ are limited to those in which the server on which each of the applications App1 and App2 hosts is one of A or B. Therefore, there are 2×2=4 patterns of concrete configurations that are reachable from the requirement $T_0$.

Figure 3:
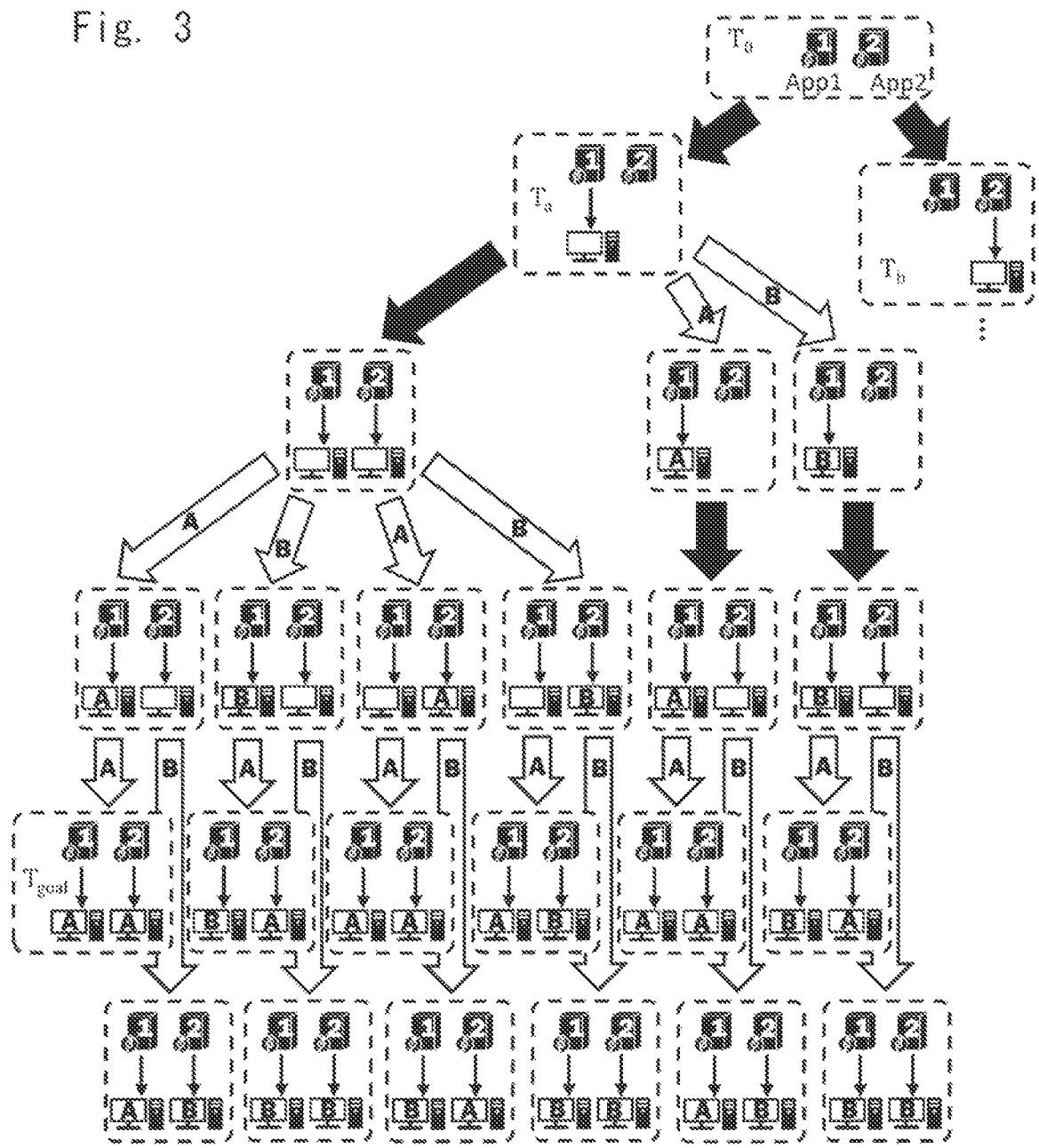
FIG. 3 is an explanatory diagram showing an example of a search tree including redundant paths, which is a problem of related automatic design techniques.

As described above, while the number of concrete configurations that are reachable by the requirement $T_0$ is relatively small, the size of the search tree starting from the requirement $T_0$ may become large. FIG. 3 is an explanatory diagram showing a part of a search tree obtained by applying the automatic design process disclosed in Non-Patent Literature 1, starting from the requirement $T_0$. Black arrows indicate concretizing actions by APP-HOST, white arrows to which labels "A" are attached indicate concretizing actions by USE-SERVER-A, and white arrows to which labels "B" are attached indicate concretizing actions by USE-SERVER-B, and information on the applied parts is omitted.

Two concretizing actions can be applied to the requirement $T_0$, causing the search tree to make a transition to $T_a$ and $T_b$. FIG. 3 shows all the abstract configurations that are reachable from $T_a$. Further, $T_b$ has a structure symmetrical to that of $T_a$, and when the search proceeds, abstract configurations whose number corresponds to that of $T_a$ are obtained. That is, when search starting from $T_0$ is performed, up to 44 abstract configurations are reachable by concretization. In the actual automatic design process, not all of these 44 abstract configurations are searched. However, when, for example, a general breadth-first search is employed as a search strategy for a tree search, in the case shown in FIG. 3, a concrete configuration is finally found at a timing when the 21-th abstract configuration (e.g., $T_{goal}$ and so on in FIG. 3) is generated.

Figure 4:
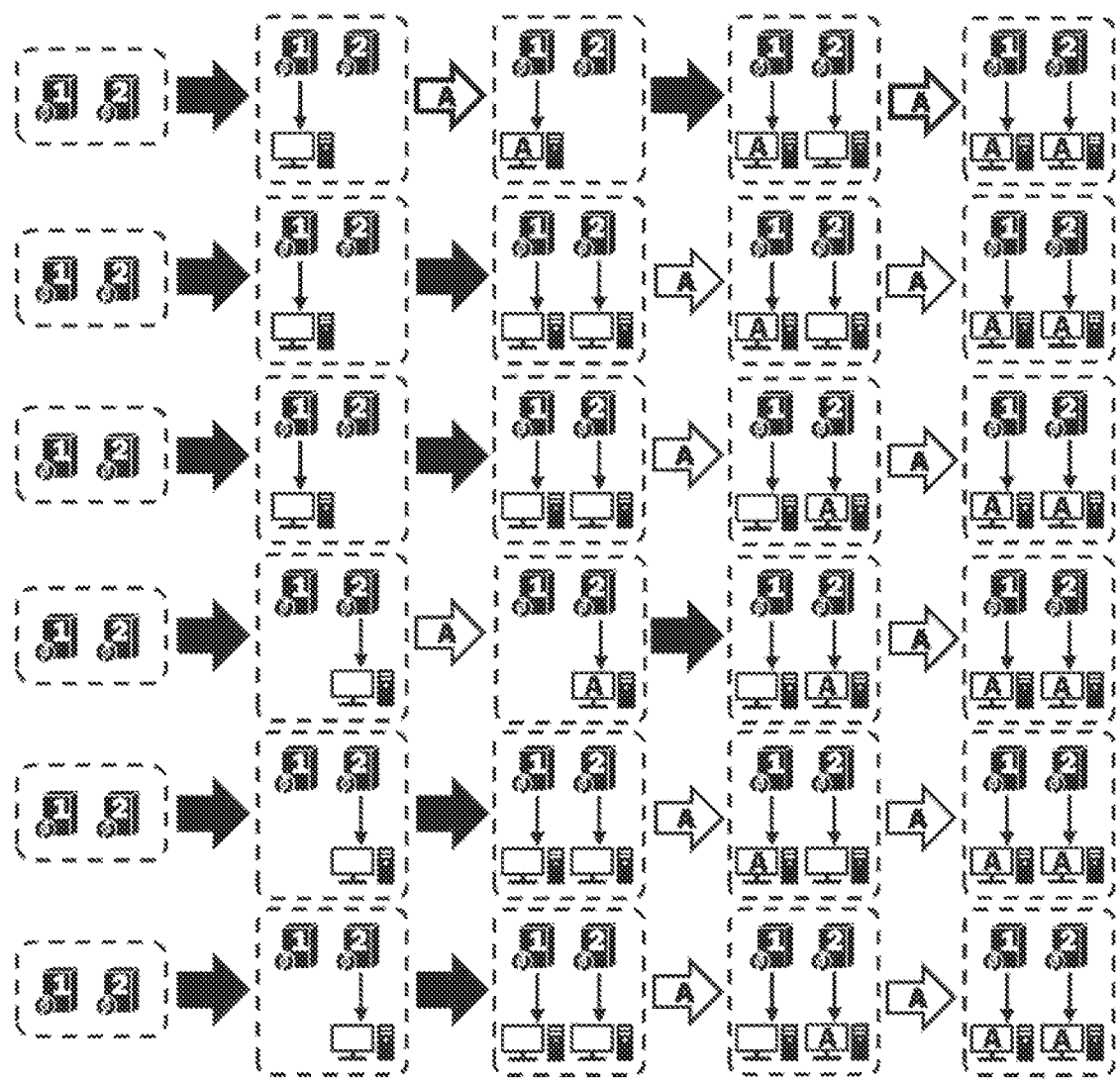
FIG. 4 is an explanatory diagram showing an example of redundant paths that reach the same concrete configuration included in FIG. 3.

The search tree shown in FIG. 3 includes many search paths that are "redundant" in the following means. FIG. 4 shows six "concretizing paths (=an execution sequence of a series of concretizing actions that reach the concrete configuration, starting from the requirement $T_0$)" included in the whole search tree in FIG. 3.

The six concretizing paths shown in FIG. 4 all execute the same concretizing actions, and only the orders in which they are executed are different. Therefore, these six concretizing paths eventually reach the same concrete configuration. Since the purpose of the automatic design is to find concrete configurations that are reachable from a requirement, separately searching for the aforementioned six concretizing paths is redundant and nonsense. That is, ideally, one of these six concretizing paths should be searched for as a representative path and the other five concretizing paths, which can be regarded as redundant paths, should not be searched for.

FIG. 3 includes many other redundant paths like the ones described above. Specifically, there are six concretizing paths for one concrete configuration that is reachable, and these six concretizing paths are redundant concretizing paths that can be considered equivalent to each other if their order is changed.

Described above is the description regarding redundant search of redundant concretizing paths, which is one of the major causes of the rapid increase in the computation time in the existing system automatic design.

One of well-known methods to deal with redundant search of the aforementioned redundant paths is a Partial-Order Reduction (POR: see Non-Patent Literature 2). POR is a method for determining one representative path from the aforementioned redundant paths and searching for only this representative path to omit searching of the other redundant paths.

Further, in Non-Patent Literature 3, a "Probe Set POR", which is a POR method specialized regarding a mechanism (Graph Rewriting System) for rewriting a graph-like structure as employed in a system automatic design, is proposed.

It is considered, however, that, when Probe Set POR is applied to the automatic design process, Probe Set POR needs to be improved in view of two aspects. The first aspect is that overhead of the computation time is large since the load of processing for calculating the representative path is heavy. The second aspect is that Probe Set POR includes processing for supplementing concretization paths to a previously searched state during the search (i.e., branches that do not originally exist are added later), which causes the whole processing to be complicated. This second aspect itself does not directly affect the computation speed. However, since exceptional behavior is included as the tree search, there is concern that this method may be incompatible with other general methods for improving the speed of the tree search (e.g., a method for optimizing the direction in which the tree search proceeds by reinforcement learning, as mentioned in Non-Patent Literature 1).

The example embodiments that will be described below contribute to solving the aforementioned problem.

First Example Embodiment

Configuration of First Example Embodiment

Figure 5:
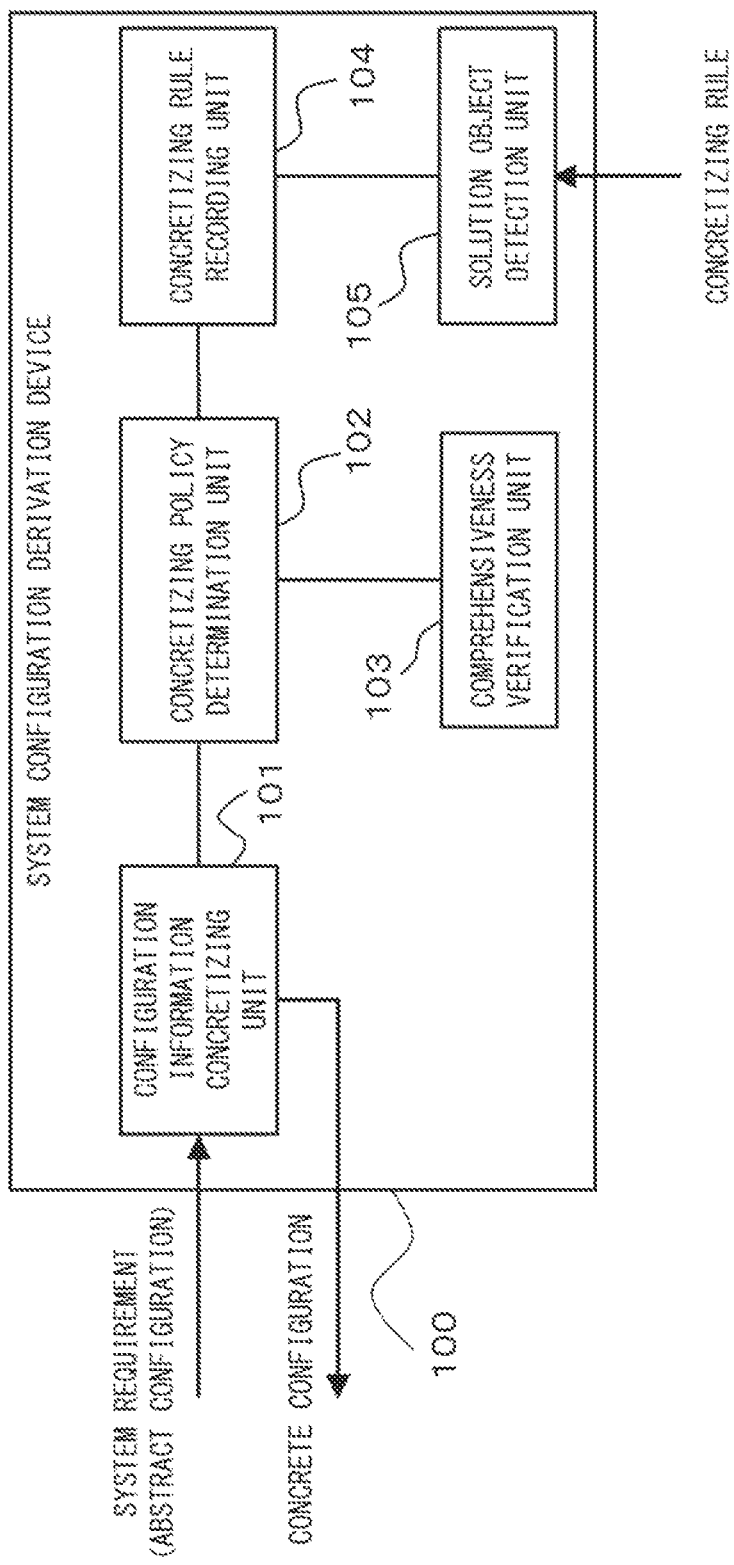
FIG. 5 is a block diagram showing a configuration example of a system configuration derivation device according to the first example embodiment.

First, with reference to the drawings, a configuration of a first example embodiment of the present disclosure will be described. FIG. 5 is a block diagram showing a configuration example of a system configuration derivation device 100 according to the first example embodiment.

Referring to FIG. 5, the system configuration derivation device 100 according to the first example embodiment includes a configuration information concretizing unit 101, a concretizing policy determination unit 102, a comprehensiveness verification unit 103, a concretizing rule recording unit 104, and a solution object detection unit 105.

The configuration information concretizing unit 101 receives, from an external input/output device (not shown), a system requirement as an abstract configuration and as input, derives a concrete configuration by sequentially applying concretizing rules that are applicable to the input abstract configuration, and outputs the derived concrete configuration to the external input/output device.

The concretizing policy determination unit 102 receives the abstract configuration as input from the configuration information concretizing unit 101 and outputs a list of concretizing actions that should be applied to the input abstract configuration to the configuration information concretizing unit 101.

The comprehensiveness verification unit 103 receives, from the concretizing policy determination unit 102, the abstract configuration, an abstract element included in the abstract configuration, and the list of concretizing actions that can solve this abstract element as input. Then, the comprehensiveness verification unit 103 verifies whether the concretizing actions that can solve the input abstract element in the future are covered by the input list of concretizing actions, and outputs the result of the verification to the concretizing policy determination unit 102.

The solution object detection unit 105 receives the list of concretizing rules as input from the external input/output device, detects all the abstract elements that may be solved by applying the input concretizing rules, creates a database for sending a list of appropriate concretizing rules depending on the type of the abstract element, and outputs the created database to the concretizing rule recording unit 104.

The concretizing rule recording unit 104 receives the aforementioned database as input from the solution object detection unit 105 and holds the input database. Further, the concretizing rule recording unit 104 receives an abstract element as input from the concretizing policy determination unit 102 and sends a list of concretizing rules that may solve the input abstract element to the concretizing policy determination unit 102 as a response based on the aforementioned database.

Hereinafter, an abstract configuration and a data structure of the abstract configuration in the first example embodiment will be described.

As already described above, the abstract configuration is an abstract system configuration in which there is an undetermined part of configuration and setting. The abstract configuration is a configuration expressed by a subject who desires the ICT system. The abstract configuration is a configuration which plays a role of defining the desired system without specifically referring to the details of the system by representing only determined information, that is, information representing "what requirements the system should meet and what functions the system should have".

The basic structure of the abstract configuration is a graph with "nodes" that correspond to the functional, logical and physical components of the system and "edges" that represent the relationship between those two nodes by connecting them. The aforementioned edges have a direction. For an edge from a node A to a node B, the node A is referred to as a "connection source" and the node B is referred to as a "connection destination". When nodes and edges are referred to indistinguishably, nodes and edges are referred collectively as "entities".

The aforementioned entity has an "identifier" to uniquely identify the entity in the whole system and "type information" to express what concept the entity corresponds to. The identification of entities in the two different abstract configurations, such as "abstract configurations before and after concretization" or "the left side and the right side of a concretizing rule", is performed by identifiers. That is, even in a case in which entities have different type information, if the identifiers thereof are the same, they are treated as "the same entity".

Hereinafter, "type information" accompanied by an entity will be described in more detail.

The aforementioned type information plays a role of indicating the type of the entity accompanied by the type. There are two kinds of types, i.e., an "abstract type" and a "concrete type". The abstract type indicates an entity that does not intuitively correspond to a concrete component that exists in reality or their connection relationships and a kind of entity where further concretization is required, such as "Machine" or "Hypertext Transfer Protocol (HTTP) connection available". On the other hand, the concrete type indicates an entity that corresponds to a concrete component that exists in reality or their connection relationships, such as "(model number of the concrete machine)" or "wired LAN connection".

As described above, there is a concept of abstraction in types. In accordance with the concept of abstraction, a concept of a parent-child relationship, which is based on a relationship that "a type t2 is more concrete than type a t1", is defined between the pieces of the aforementioned type information. When the type t2 is more concrete than the type t1, it is said that the type t1 is a parent of the type t2 or a parent type and the type t2 is a child of the type t1 or a child type.

While the details will be described later in the description regarding concretizing rules, the type of a node can be converted into the child type of this node by applying concretizing rules. This operation corresponds to an operation of narrowing down candidates of the types of the nodes to more concrete types of nodes according to the concretizing rules.

Further, information accompanied by a node includes, besides the aforementioned "identifier" and "type information", a "request component (or a required component) (of the node type)". There may be a plurality of "request components" in the node or there may be no "request components" in the node.

Described above is "type information" accompanied by the entity.

Hereinafter, a "request component" accompanied by a node will be described in more detail. The node accompanied by the "request component" is simply expressed as this node itself having a request component.

The request component accompanied by the node intuitively indicates a dependent component that is necessary for a normal operation of the component that corresponds to the node. For example, a node-type node of "App" indicating an application has "Machine" as a request component. This indicates that, in order to operate an application, a machine that hosts the application is required.

When the node N1 has a request component req, a special edge-type edge of "WIRE: req" (the part of "req" changes depending on the request component) is connected from a node N1 to another node N2, whereby it is possible to connect the request component requested for the node N1. This corresponds to selection of N2 as a request component req requested by N1. When the node has a request component, the request can be satisfied by connecting an appropriate component to this node.

Take the previous example of the App-type node as an example. By connecting a "WIRE: Machine"-type edge to a Machine-type node Machine1 from the App-type node MyApp, it is possible to specify the node Machine1 as the host for the node MyApp.

Only one node can be connected to a request component that a node has. For example, to the node MyApp after it is connected to the node Machine1 in the above example, another Machine-type node Machine2 cannot be connected by the "WIRE: Machine"-type edge.

Figure 6:
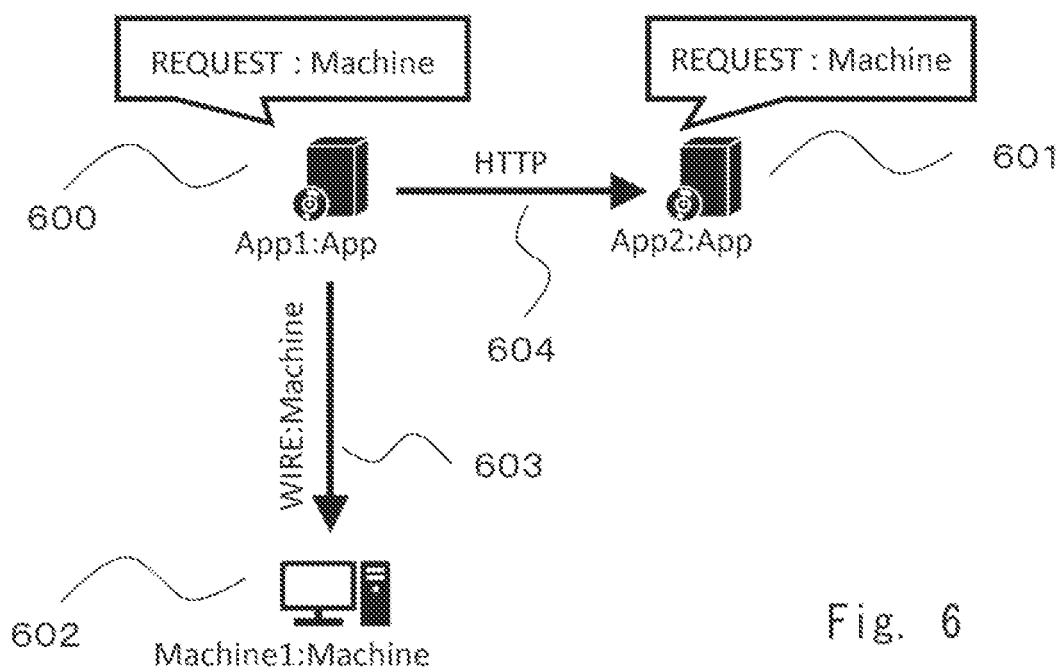
FIG. 6 is an explanatory diagram showing an example of an abstract configuration given as one of input of the system configuration derivation device according to the first example embodiment.

Described above is the "request component" accompanied by a node. FIG. 6 is an example of the abstract configuration. The icons with labels, as shown by nodes 600, 601, and 602, indicate nodes, and the arrows with labels, as shown by edges 603 and 604, indicate edges. The labels of the nodes have a form of "(identifier): (type name)". On the other hand, the labels of the edges show only the type names thereof. Further, the nodes 600 and 601 are each accompanied by a callout indicating a request component. To simplify the drawings, information on the requests and the labels may be omitted as appropriate.

The nodes 600 and 601 both indicate applications. It is assumed here that the nodes 600 and 601 both correspond to concrete components that do not include undetermined parts. The nodes 600 and 601 both have a request component "Machine" and the request of the node 600 is satisfied since Machine1 is connected thereto, but the request of the node 601 is not satisfied.

The node 602 is a node indicating "some kind of machine". That is, in the node 602, it is determined that it is a machine on which an application can be run but it is not determined what specific product will be used.

The edge 603 is an edge showing a concrete relationship, indicating that the node 600 of the connection source is hosted on the node 602 of the connection destination. The node 602 is connected to the node 600 by the edge 603, whereby the "Machine" request of the node 600 is met.

The edge 604 is an edge indicating an abstract relationship (in a sense that a concrete communication path is indefinite), indicating that it is guaranteed that the node 600 of the connection source is able to transmit an HTTP request to the node 601 of the connection destination by any means.

Described above is a specific example of the abstract configuration.

Hereinafter, concretizing rules in the first example embodiment will be described. As already described above, a concretizing rule includes information indicating a concretization object (hereinafter referred to as "the left side (of the concretizing rule)") and information indicating a configuration after concretization (hereinafter referred to as "the right side (of the concretizing rule)").

The left side and the right side of the concretizing rule are attributed graphs, like in the basic structure of the abstract configuration.

The entities that exist in the left side and the right side of the concretizing rule need to satisfy the following three conditions (1), (2), and (3).
  (1) The node that exists in the left side must absolutely exist in the right side as well. This is a constraint to ensure that the existence itself of the component already added to the abstract configuration by concretization does not disappear.
  (2) There is no entity of a concrete type in the left side. This is a constraint to ensure that concretization for withdrawing a part that is determined once and rewriting this part is not performed.
  (3) Regarding a node v that exists both in the left side and the right side, "the type of v on the left side" needs to be the same as "the type of v on the right side" or needs to be the parent type thereof. This is a constraint for ensuring that the rewriting of the type of the component that occurs due to concretization is limited to "narrowing down the type to a more concrete one" and that rewriting to a component whose type is completely different from that of the current one never occurs.

Next, details of how an abstract configuration is concretized by concretizing rules will be described.

A concretizing rule r is said that it can apply to an abstract configuration D when a structure corresponding to the left side of the concretizing rule r is included in the abstract configuration D. Here, the expression "the abstract configuration D has a structure corresponding to the left side of the concretizing rule r" means that (1) as a subgraph of d, the one whose type is exactly the same as that on the left side of r is included, and (2) in one-to-one relationship between entities based on the aforementioned (1), "the type of the entity on the left side of r" is a parent type of "the type of the entity on the d side".

The aforementioned "subgraph of the abstract configuration D, corresponding to the left side of the concretizing rule r" is called a concretization object of the abstract configuration D by the concretizing rule r.

That is, when the concretizing rule r can be applied to the abstract configuration D, d has a substructure (i.e., the concretization object) that corresponds one-to-one with the left side of r. Rewriting of an abstract configuration D by the concretizing rule r means replacing the aforementioned concretization object with a structure expressed by the right side of the concretizing rule r.

When there is an entity $e_{new}$ that does not exist in the left side of the concretizing rule and exists only in the right side, basically, a corresponding entity is newly created and a new identifier that is not included in the abstract configuration is given. When, however, an entity $e_{reused}$ having a type the same as that of $e_{new}$ or a child type thereof already exists (in a part different from that of a concretization object) in the abstract configuration, the existing $e_{reused}$ may be used instead of newly creating an entity. This is called "reuse" of the entity $e_{reused}$ in an application of a concretizing rule.

When a concretizing rule is applied to an abstract configuration, a correspondence relationship between entities indicating a concretization object and a reuse object can be considered. This correspondence relationship is referred to as an "applied part" in the application of the concretizing rule, and a collection of the concretizing rule and information on the applied part is called a "concretizing action".

Hereinafter, concretizing rules and its applications will be illustrated using specific examples. As already described above, FIG. 2 is an explanatory diagram showing three specific examples of concretizing rules in the first example embodiment.

A rule 200R shows a concretizing rule "APP-HOST" showing, by the left side and the right side, a method for converting a graph so as to satisfy a request by connecting a "Machine"-type node to an "App"-type node where a "Machine" request is not met. The rule 200R expresses an operation of connecting a "Machine"-type node {2} to the "App"-type node {1} already included in the abstract configuration by a "WIRE: Machine"-type edge. According to this operation, the "Machine" request of the node {1} can be satisfied.

Figure 7:
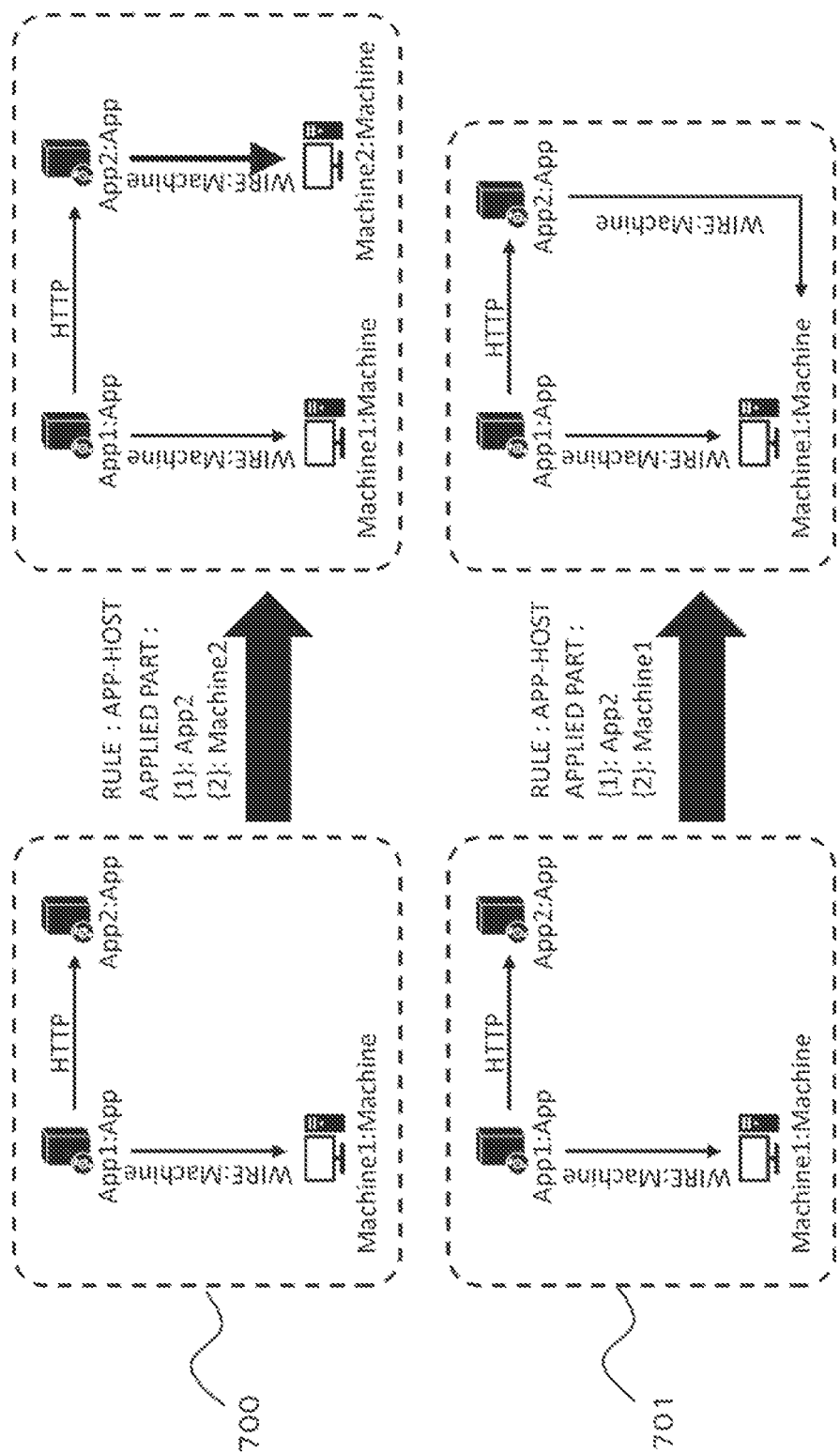
FIG. 7 is an explanatory diagram showing an example of an application of a concretizing rule (=execution of a concretizing action)

FIG. 7 is a diagram for describing a specific example in which the rule 200R is applied in the two different methods shown in FIG. 6.

Referring to FIG. 7, an application example 700 corresponds to a case in which the rule 200R is applied to the applied part "{1}: App2, {2}: Machine2". That is, the node {1} in the concretizing rule and the node App2 in FIG. 3 are made to correspond to each other and the rule 200R is applied thereto. A Machine-type node corresponding to {2} is newly created and an identifier "Machine2" is given thereto.

On the other hand, an application example 701 corresponds to a case in which the rule 200R is applied to the applied part "{1}: App2, {2}: Machine1". In this case, the node Machine1 is reused. That is, as a Machine-type node that corresponds to the node {2} that exists in only the right side of the rule 200R, a node Machine1 that already exists is used.

As described above, a plurality of concretizing actions may be taken for the same concretizing rule and the same abstract configuration.

Described above is rewriting of the abstract configuration by applying concretizing rules.

Next, abstract elements included in an abstract configuration according to the first example embodiment will be described. There are three kinds of abstract elements, i.e., an "abstract node", an "abstract edge", and an "unreached request". In this description, an accurate definition that each abstract element is solved by a concretizing action will also be described.

The "abstract node" abstract element indicates a node having an abstract type included in an abstract requirement. Hereinafter, an abstract element corresponding to a node v having an abstract type t is represented by v: t. It is defined that the abstract element v: t being "solved" by the concretizing action a means that "the type of the node v is changed from t after the concretizing action a is applied".

Hereinafter, the "abstract node" abstract element and a specific example of the solution will be described.

Machine1 of $T_2$ in FIG. 1 is a "Machine"-type node. This indicates that Machine1 is a component where it is determined that it is a computer on which an application can be run but it is not determined what specific product will be used. That is, $T_2$ has an "abstract node" abstract element Machine1: Machine.

The concretizing action applied to $T_2$ (in this example, it is assumed that this action is "a3") changes the type of Machine1 to "Server-A", which corresponds to a concrete server product. Therefore, the application of the concretizing action a3 causes the abstract element Machine1: Machine of $T_2$ to be solved.

Described above is the "abstract node" abstract element and the specific example of the solution.

The "abstract edge" abstract element indicates an edge having an abstract type included in an abstract requirement. Hereinafter, an abstract element that corresponds to an edge $v_s \rightarrow v_d$ having an abstract type t is represented by $v_s \rightarrow v_d$:t. It is defined that the abstract element $v_s \rightarrow v_d$:t being "solved" by the concretizing action b means that "the edge $v_s \rightarrow v_d$ is deleted after a concretizing action b is applied".

Described below is the "abstract edge" abstract element and a specific example of the solution.

Figure 8:
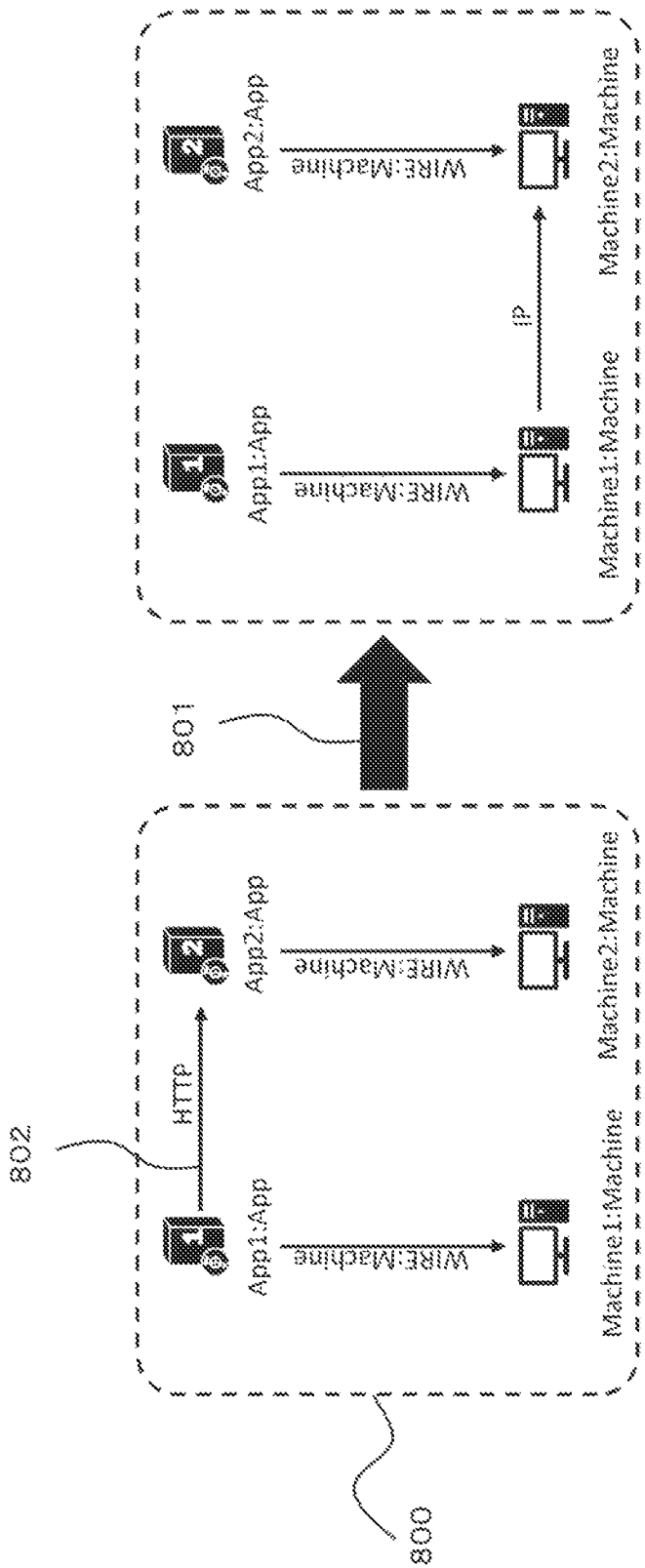
FIG. 8 is an explanatory diagram showing an example of solution of an "abstract edge" abstract element by a concretizing action.

An edge 802 that is included in an abstract configuration 800 shown in FIG. 8 and is connected from the node App1 to the node App2 is an "HTTP"-type edge. This indicates that the edge 802 is an edge where it is determined that HTTP communication from App1 to App2 is available but it is not determined how exactly this communication is performed. That is, the abstract configuration 800 has an "abstract edge" abstract element App1→App2: HTTP.

A concretizing action 801 applied to the abstract configuration 800 deletes the edge 802. Therefore, the application of the concretizing action 801 causes the abstract element App1→App2: HTTP of the abstract configuration 800 to be solved.

Described above is the "abstract edge" abstract element and the specific example of the solution.

The "unreached request" abstract element indicates a request that a node included in an abstract requirement has, and is an element to which the requested element is not connected by an appropriate edge. Hereinafter, an abstract element corresponding to a request p that a node v has is represented by v.p. It is defined that the abstract element v.p being "solved" by a concretizing action c is that "an appropriate component is appropriately connected to the request p of the node v after the application of the concretizing action c".

Described below is the "unreached request" abstract element and a specific example of the solution.

App1 of $T_0$ in FIG. 1 has a request component of "Machine". This indicates that App1 requires a machine for its operation. Further, the request component "Machine" of App1 does not include a component connected thereto. That is, $T_0$ has an "unreached request" abstract element App1. Machine.

The concretizing action applied to $T_0$ (in this example, "a0") connects Machine1 to App1 by the "WIRE: Machine"-type edge. Therefore, the application of the concretizing action a0 causes the abstract element App1.Machine of $T_0$ to be solved.

Described above is the "unreached request" abstract element and the specific example of the solution.

Lastly, the concrete configuration derived according to the first example embodiment will be described.

The concrete configuration in the first example embodiment indicates a completely concretized abstract configuration. Here, the abstract configuration being "completely concretized" means that the abstract requirement does not include even a single abstract element. The abstract configuration that does not include an abstract element is in a state in which the system is free of ambiguity and all the components necessary for the operation are provided. Therefore, the concrete configuration corresponds to a system that completely performs a functionally complete operation.

Operations in First Example Embodiment

The system configuration derivation device 100 according to the first example embodiment receives a system requirement (abstract configuration) as input and outputs a concrete configuration that satisfies the system requirement. This series of processes is called an automatic design process. The configuration information concretizing unit 101, the concretizing policy determination unit 102, the comprehensiveness verification unit 103, and the concretizing rule recording unit 104 process the automatic design process.

Further, the system configuration derivation device 100 according to the first example embodiment loads a list of concretizing rules to be used for the automatic design process in advance as preprocessing before the automatic design process is executed. The solution object detection unit 105 executes this preprocessing.

Described below are the details of the processing of each part of the system configuration derivation device 100.

Figure 9:
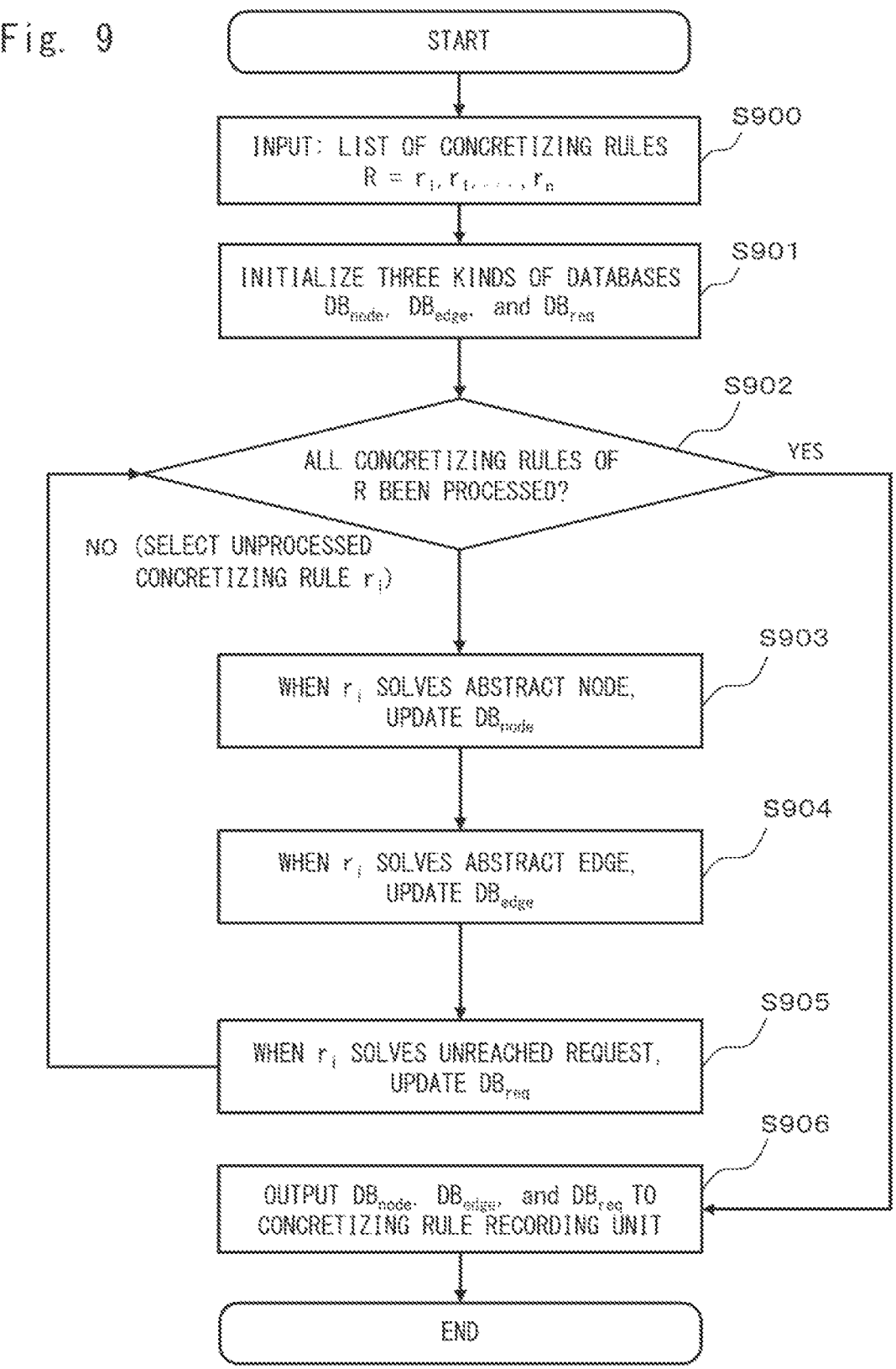
FIG. 9 is a flowchart for describing an operation example of a solution object detection unit according to the first example embodiment.

First, with reference to the drawings, an operation of the solution object detection unit 105 according to the first example embodiment will be described. FIG. 9 is a flowchart showing processing in which the solution object detection unit 105 according to the first example embodiment loads concretizing rules. Referring to FIG. 9, first, the solution object detection unit 105 receives, from an external input/output device, a list of concretizing rules R=$r_1, \ldots, r_n$ as input (Step S900).

Next, the solution object detection unit 105 initializes three databases $DB_{node}$, $DB_{edge}$, and $DB_{req}$ (Step S901). Here, the databases $DB_{node}$, $DB_{edge}$, and $DB_{req}$ are databases for sending the "list of concretizing rules" in response to a value, which serves as a key, and the aforementioned "initialize" refers to a state in which an empty list is sent for any key.

The solution object detection unit 105 executes Steps S903 to S905 on each concretizing rule $r_i$ (i=1, . . . , n) included in the list of concretizing rules R received as input (Step S902).

The solution object detection unit 105 investigates all the nodes in which the left side of the concretizing rule $r_i$ and the right side thereof have types different from each other. When such a node exists, the concretizing rule $r_i$ can solve the abstract node. Therefore, the solution object detection unit 105 adds the concretizing rule $r_i$ to a list $DB_{node}[t]$ obtained using a type t on the left side of each node as a key, and updates the database $DB_{node}$ (Step S903).

The solution object detection unit 105 investigates all the edges that exist in the left side of the concretizing rule $r_i$ and do not exist in the right side thereof. When such an edge exists, the concretizing rule $r_i$ can solve the abstract edge. In this case, the solution object detection unit 105 adds the concretizing rule $r_i$ to a list $DB_{edge}[t]$ obtained using the type t of each edge as a key, and updates the database $DB_{edge}$ (Step S904).

The solution object detection unit 105 investigates all the request components that are not satisfied in the left side of the concretizing rule $r_i$ but are satisfied in the right side thereof. When such a request component exists, the concretizing rule $r_i$ can solve the unreached request. Therefore, the solution object detection unit 105 adds the concretizing rule $r_i$ to a list $DB_{req}[p]$ obtained using each request component p as a key and updates the database $DB_{req}$ (Step S905).

When processing is completed for all the concretizing rules that are included in R (YES in Step S902), the solution object detection unit 105 outputs the three databases $DB_{node}$, $DB_{edge}$, and $DB_{req}$ to the concretizing rule recording unit 104 as data for inquiry response (Step S906), and ends the processing.

Described above is the operation when the solution object detection unit 105 according to the first example embodiment loads concretizing rules.

Figure 10:
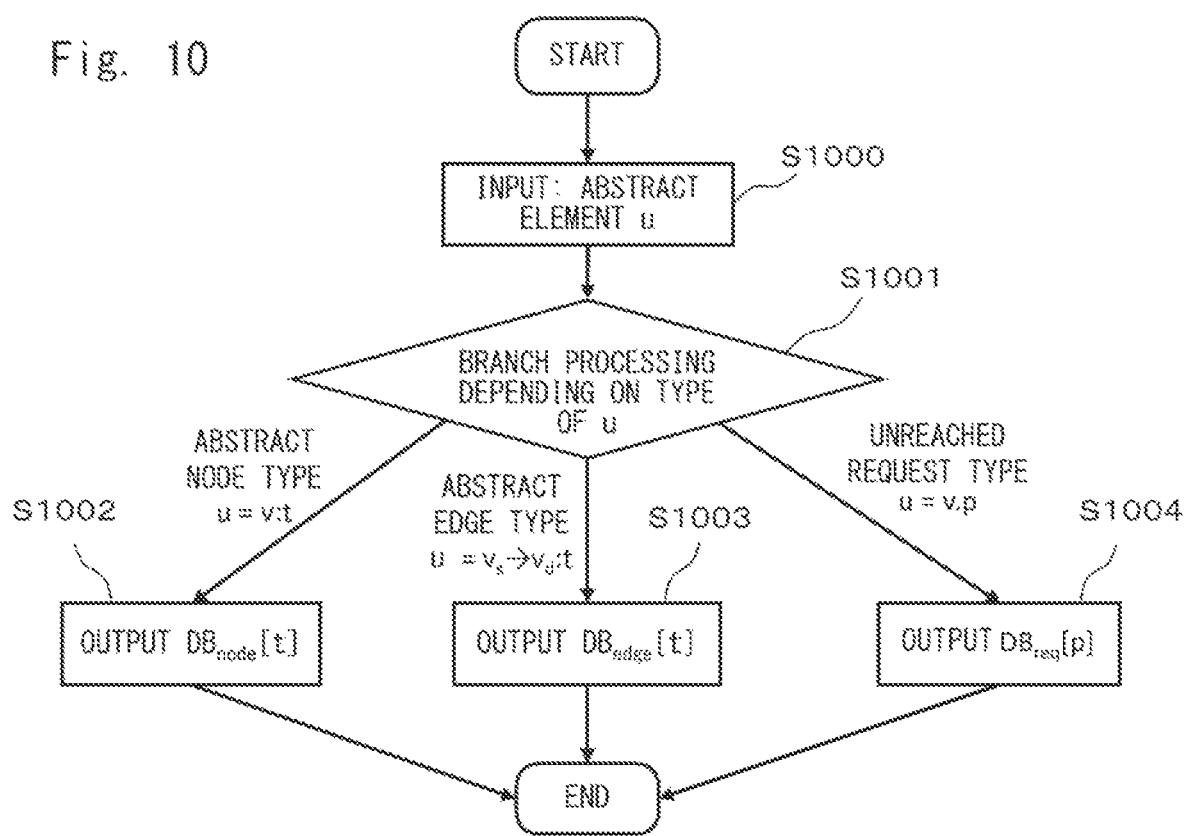
FIG. 10 is a flowchart for describing an operation example of a concretizing rule recording unit according to the first example embodiment.

Next, with reference to the drawings, an operation of the concretizing rule recording unit 104 according to the first example embodiment will be described. FIG. 10 is a flowchart showing processing when the concretizing rule recording unit 104 according to the first example embodiment sends, in response to an input abstract element, a list of concretizing rules that may solve this abstract element. It is assumed that preprocessing in FIG. 9 has already been performed before the operation in FIG. 10 and the concretizing rule recording unit 104 already has the three databases $DB_{node}$, $DB_{edge}$, and $DB_{req}$ received from the solution object detection unit 105.

Referring to FIG. 10, first, the concretizing rule recording unit 104 receives the abstract element u from the concretizing policy determination unit 102 as input (Step S1000).

The concretizing rule recording unit 104 branches processing depending on whether the abstract element is an "abstract node v: t", an "abstract edge $v_s \rightarrow v_d$:t", or a "request component v.p" (Step S1001).

When the abstract element is the "abstract node v:t", the concretizing rule recording unit 104 outputs the list of concretizing rules $DB_{node}[t]$ included in the database $DB_{node}$ to the concretizing policy determination unit 102 and ends the processing (Step S1002).

When the abstract element is the "abstract edge $v_s \rightarrow v_d$: t", the concretizing rule recording unit 104 outputs the list of concretizing rules $DB_{edge}[t]$ included in the database $DB_{edge}$ to the concretizing policy determination unit 102 and ends the processing (Step S1003).

When the abstract element is the "request component v.p", the concretizing rule recording unit 104 outputs the list of concretizing rules $DB_{req}[p]$ included in the database $DB_{req}$ to the concretizing policy determination unit 102 and ends the processing (Step S1004).

Described above is the processing in which the concretizing rule recording unit 104 according to the first example embodiment sends, in response to the input abstract element, a list of concretizing rules that may solve this abstract element.

Figure 11:
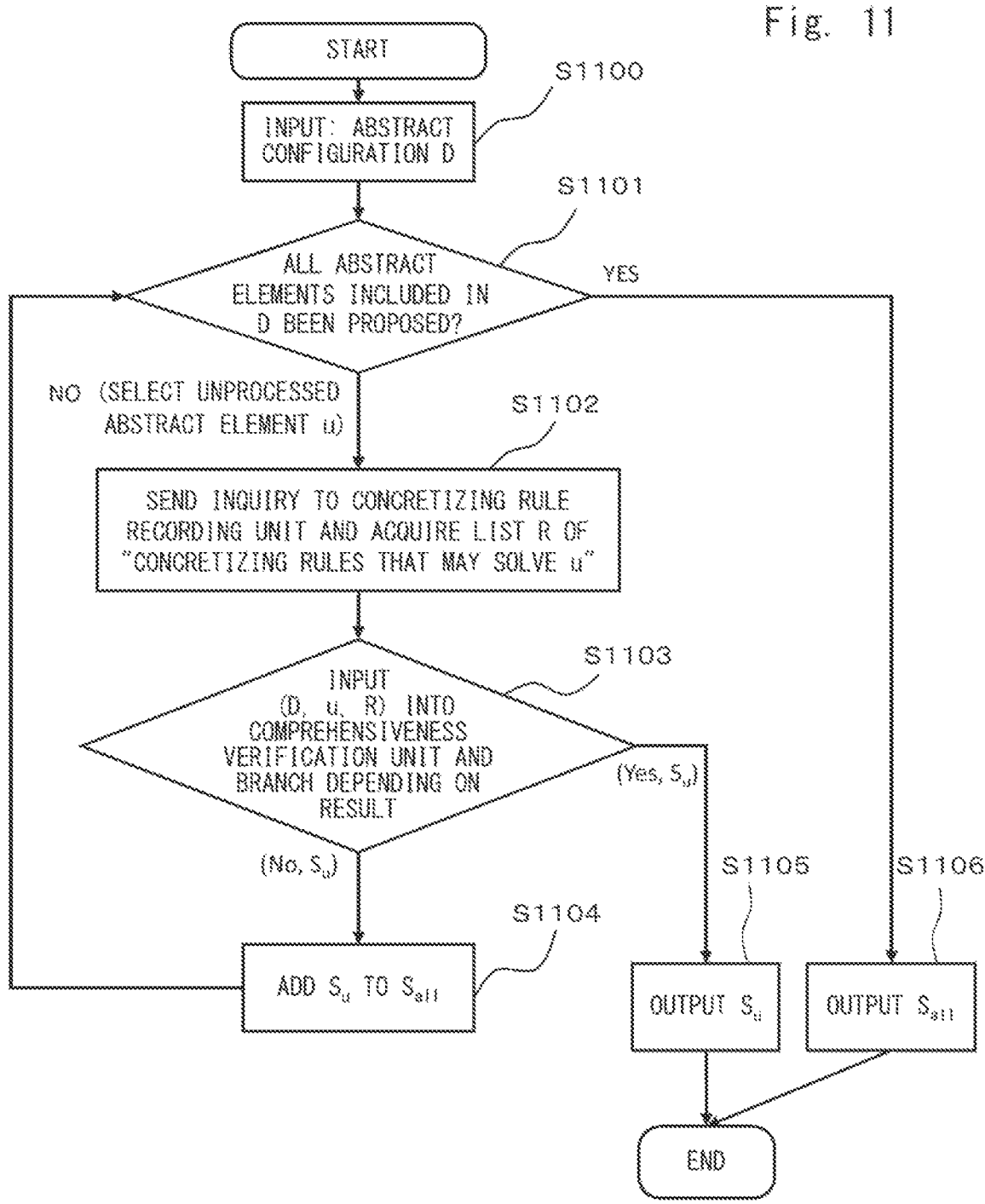
FIG. 11 is a flowchart for describing an operation example of a concretizing policy determination unit according to the first example embodiment.

Next, with reference to the drawings, an operation of the concretizing policy determination unit 102 according to the first example embodiment will be described. FIG. 11 is a flowchart showing the entire operation of the concretizing policy determination unit 102 according to the first example embodiment.

Referring to FIG. 11, first, the concretizing policy determination unit 102 receives an abstract configuration D from the configuration information concretizing unit 101 as input (Step S1100).

The concretizing policy determination unit 102 sequentially executes processing of Step S1102 and the following processing on each abstract element u included in the abstract configuration D (Step S1101).

The concretizing policy determination unit 102 sends an inquiry to the concretizing rule recording unit 104 about concretizing rules that may solve the abstract element u of the abstract configuration D, and acquires a list of the concretizing rules R that may solve the abstract element u (Step S1102).

The concretizing policy determination unit 102 inputs the abstract configuration D, the abstract element u, and the list of the concretizing rules R acquired in Step S1102 to the comprehensiveness verification unit 103 and obtains output from the comprehensiveness verification unit 103 (Step S1103). As will be described later, the output from the comprehensiveness verification unit 103 is a pair in which "Yes (it is definitely comprehensive)" or "No (it may not be comprehensive)" is added to a list of concretizing actions $S_u$ obtained as a result of investigating the application of the concretizing rules included in R to the abstract requirement D. The following processing branches into two parts depending on the result of the output from the comprehensiveness verification unit 103 obtained in Step S1103.

When the result of the output from the comprehensiveness verification unit 103 in Step S1103 is "Yes", the concretizing policy determination unit 102 sends the list of the concretizing actions $S_u$ back to the configuration information concretizing unit 101 as output (Step S1105). Then, the concretizing policy determination unit 102 ends the processing even if there is an abstract element that is not selected in Step S1101.

When the result of the output from the comprehensiveness verification unit 103 in Step S1103 is "No", the concretizing policy determination unit 102 sends all the concretizing actions included in the list of the concretizing actions $S_u$ to a set of concretizing actions $S_{all}$ and the process returns to Step S1101 (Step S1104).

Supplement

It should be noted that the aforementioned San is a set of concretizing actions and no more than two duplicates of the same action are added. The two concretizing actions being "the same" means that the two concretizing actions apply the same concretizing rule to the same applied part.

When the processing of Step S1102 and the following processing are completed for all the abstract elements included in the abstract configuration D (YES in Step S1101), the concretizing policy determination unit 102 sends the set of concretizing actions San back to the configuration information concretizing unit 101 as output (Step S1106), and ends the processing.

Described above is the operation of the concretizing policy determination unit 102.

Next, prior to giving a specific description of the operation of the comprehensiveness verification unit 103 according to the first example embodiment, an outline of the output of the comprehensiveness verification unit 103 will be described.

The comprehensiveness verification unit 103 first receives, from the concretizing policy determination unit 102, the abstract configuration D, the abstract element u, and the concretizing rules $r_1, r_2, \ldots, r_m$ as input.

The comprehensiveness verification unit 103 sends the list of the concretizing actions $S_u$ by the concretizing rules $r_1, r_2, \ldots, r_m$ that solve the abstract element u of the abstract configuration D back to the concretizing policy determination unit 102 as output.

In addition, the comprehensiveness verification unit 103 verifies whether or not the list of the concretizing actions $S_u$ cover all the concretizing actions that solve the abstract element u of the abstract configuration D. If it is determined that all of them are covered, the comprehensiveness verification unit 103 sends Yes back to the concretizing policy determination unit 102 as output. If it is not determined that all of them are covered, the comprehensiveness verification unit 103 sends No back to the concretizing policy determination unit 102 as output.

Described below is the definition of the situation in which "all the concretizing actions that solve the abstract element u of the abstract configuration D are covered".

If it is assumed that the abstract configuration D including the abstract element u can reach a concrete configuration as a result of application of concretizing rules, since the concrete configuration includes no abstract element, the abstract element u is solved by some concretizing actions included in concretizing paths from D to C.

That is, all the concretizing paths from the abstract configuration D to a given concrete configuration must include some kind of concretizing action a(D,u) that solves the abstract element u. Such a concretizing action a(D,u) is called "an essential concretizing action (regarding the abstract element u included in the abstract configuration D)". It should be noted that, if the abstract configuration and the abstract element (and a list of concretizing rules) are determined, possible concretizing actions are uniquely determined as such an essential concretizing action.

Then, the following can be derived. When all the essential concretizing actions $a(D,u)_1, a(D,u)_2, \ldots, a(D,u)_n$ regarding the abstract element u included in the abstract configuration D can be applied to the abstract configuration D, even when $a(D,u)_1, a(D,u)_2, \ldots, a(D,u)_n$ are used as branches of the search tree (=concretizing actions that can be applied) when the abstract configuration D in the automatic design process is deployed, variations of the concrete configurations that are reachable by search is not impaired.

This is because the set of the aforementioned essential concretizing actions $a(D,u)_1, a(D,u)_2, \ldots, a(D,u)_n$ is a set of all possible essential concretizing actions regarding the abstract element u included in the abstract configuration D. Therefore, in order to reach the concrete configuration from the abstract configuration D along concretizing paths, one of the set of essential concretizing actions has to be applied. On the other hand, such an essential concretizing action can be applied to the abstract configuration at any timing.

"All the concretizing actions that solve the abstract element u of the abstract configuration D being covered" indicates the aforementioned situation in which "all the essential concretizing actions regarding the abstract element u of the abstract configuration D are covered by the list of concretizing actions that can be applied to the abstract configuration D". In this case, branches of the abstract configuration D in the search tree are not "all the applicable concretizing actions" and can be limited to "all the essential concretizing actions that are covered" whose number is generally smaller than that of "all the applicable concretizing actions". Therefore, the number of branches of the search tree can be reduced.

Described above is the exact definition for the situation "whether or not all the concretizing actions that solve the abstract element u of the abstract configuration D are covered" verified by the comprehensiveness verification unit 103 according to the first example embodiment.

Figure 12:
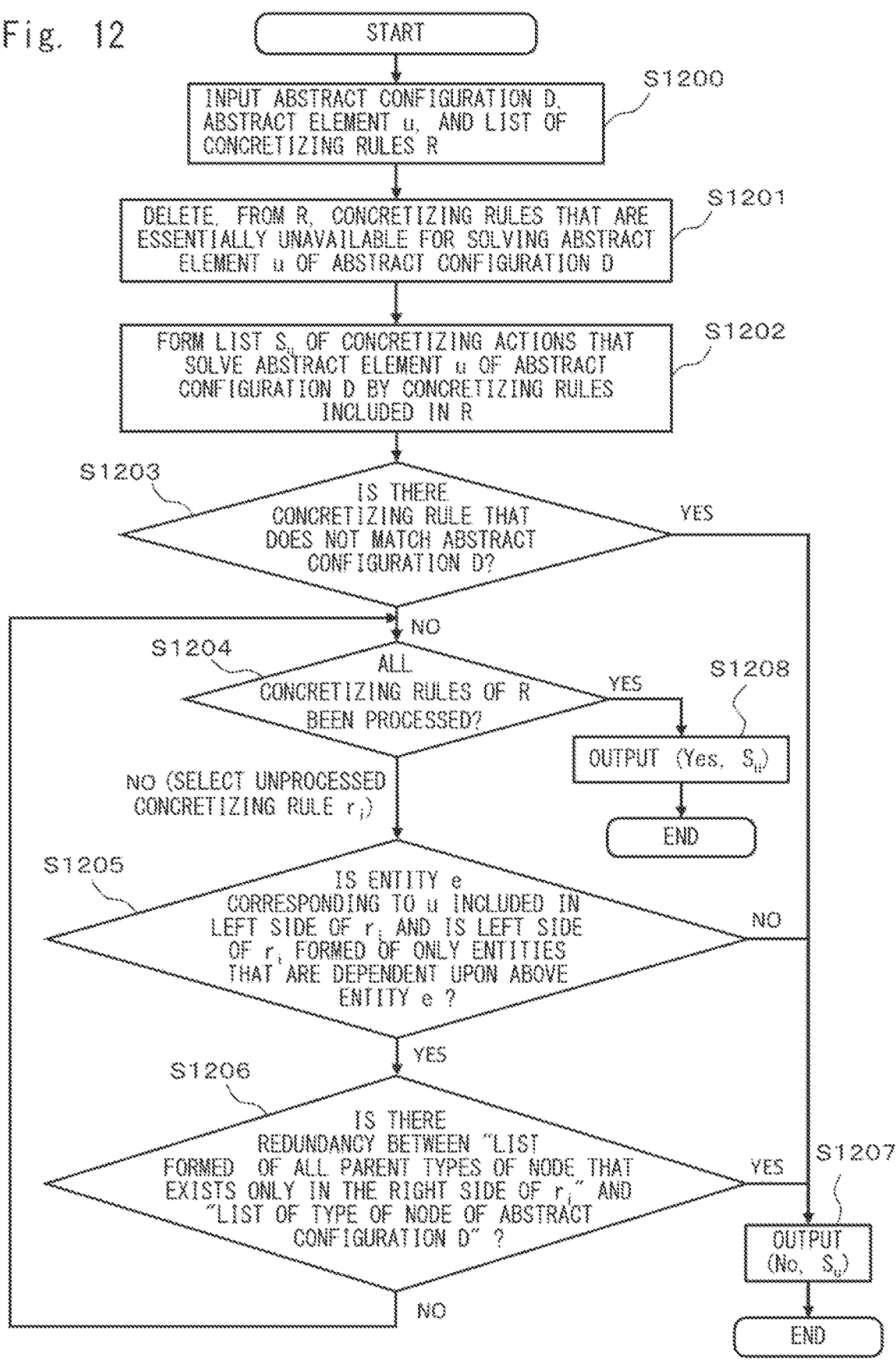
FIG. 12 is a flowchart for describing an operation example of a comprehensiveness verification unit according to the first example embodiment.

In the following, with reference to the drawings, an operation of the comprehensiveness verification unit 103 according to the first example embodiment will be described. FIG. 12 is a flowchart showing the entire operation of the comprehensiveness verification unit 103 according to the first example embodiment.

Referring to FIG. 12, first, the comprehensiveness verification unit 103 receives, from the concretizing policy determination unit 102, the abstract configuration D, the abstract element u, and the list of concretizing rules $R=r_1, r_2, \ldots, r_m$ as input (Step S1200).

Next, the comprehensiveness verification unit 103 deletes, from the list of concretizing rules $R=r_1, r_2, \ldots, r_m$, concretizing rules that are essentially unavailable for solving the abstract element u of the abstract configuration D (Step S1201).

The concretizing rules being "essentially unavailable for solving the abstract element u of the abstract configuration D" means as follows. As described above with regard to the operation of the concretizing policy determination unit 102, the list of concretizing rules R is a list of concretizing rules that can solve the abstract element u and are obtained from the concretizing rule recording unit 104. This list of concretizing rules includes concretizing rules in which the abstract configuration D (and an abstract element u included therein) and the configuration on the left side do not match each other. These concretizing rules are concretizing rules that are "essentially unavailable for solving the abstract element u of the abstract configuration D".

Figure 13:
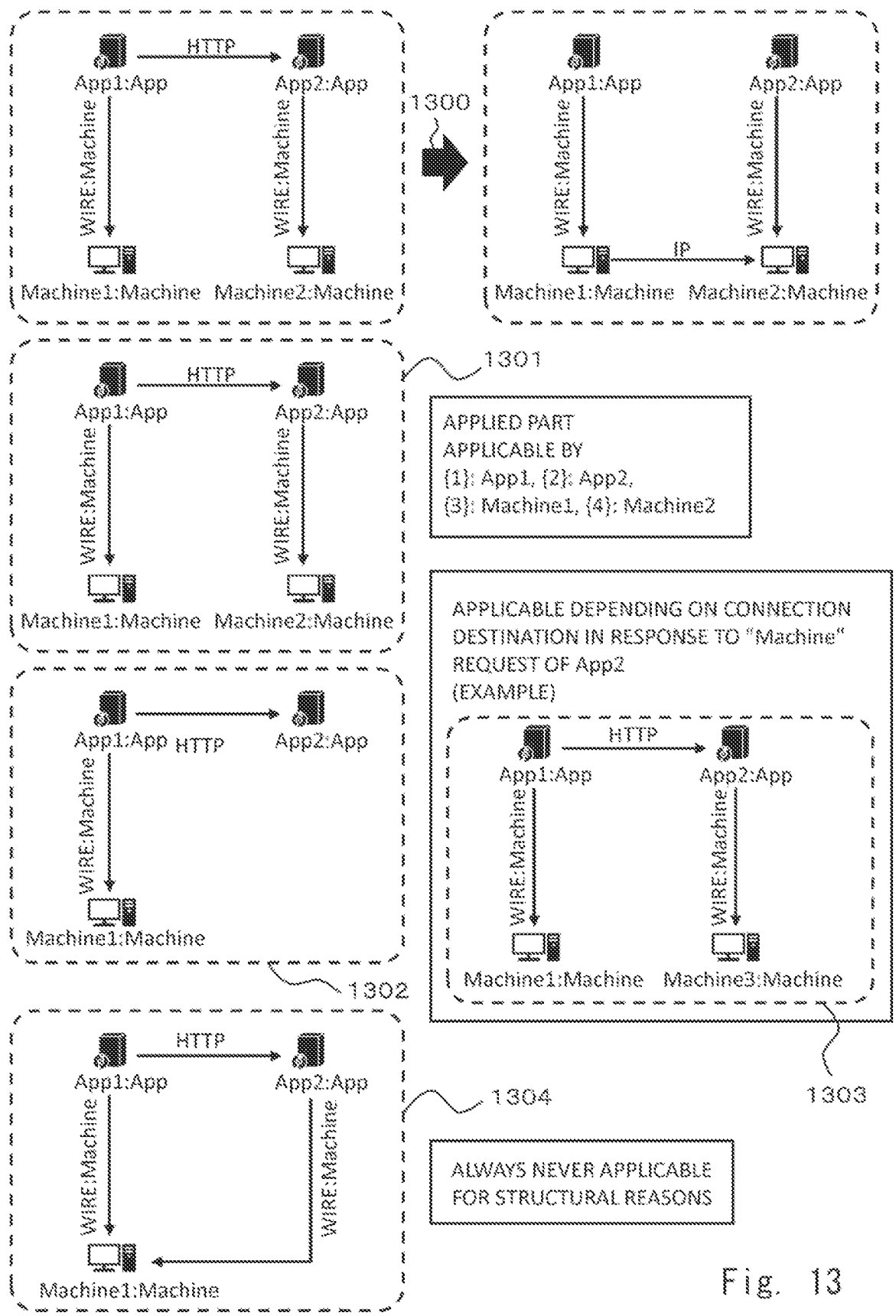
FIG. 13 is an explanatory diagram showing an example of a concrete situation in which a concretizing rule is determined to be "essentially inapplicable"

FIG. 13 is an explanatory diagram specifically describing a situation in which concretizing rules become essentially unavailable. In this example, concretization the same as that used in FIG. 8 will be described as an example.

Referring to FIG. 13, a concretizing rule 1300 is a concretizing rule in which, in a situation where two applications {1} and {2} are respectively hosted on machines {3} and {4}, an http-type edge indicating communication between the two applications is solved and an Internet Protocol (ip)-type edge indicating ip communication between the two machines is newly connected. This can clearly solve the abstract edge-type abstract element by the http-type edge.

An abstract configuration 1301, an abstract configuration 1302, and an abstract configuration 1304 are three abstract configurations having an abstract element App1→App2: http. The abstract configuration 1301 shows a situation in which App1 and App2 are respectively hosted on machines Machine1 and Machine2. The abstract configuration 1302 shows a situation in which App1 is hosted on the machine Machine1 and a machine on which App2 is hosted has not been determined. The abstract configuration 1304 shows a situation in which App1 and App2 are both hosted on the machine Machine1.

The abstract element App1→App2: http included in the abstract configuration 1301 can be solved by the concretizing rule 1300.

The abstract element App1→App2: http included in the abstract configuration 1302 cannot be readily solved by the concretizing rule 1300. However, when the abstract configuration 1302 is further concretized and a situation (an abstract configuration 1303) in which a Machine-type node other than Machine1 is connected to App2 is achieved, the abstract element App1→App2: http can be solved by the concretizing rule 1300. In this case, the concretizing rule 1300 is not "essentially unavailable".

On the other hand, the abstract element App1→App2: http included in the abstract configuration 1304 cannot be readily solved by the concretizing rule 1300. Further, even when the abstract configuration 1304 is concretized by applying another concretizing rule thereto, the abstract element App1→App2: http still cannot be solved by the concretizing rule 1300. This is because an abstract configuration that "App1 and App2 are hosted on different machines", which is required to apply the concretizing rule 1300, is not reachable by concretizing the abstract configuration 1304. Such a case is one example of the situation in which the concretizing rule 1300 is said to be "essentially unavailable".

Described above is a specific description of the situation in which concretizing rules are essentially unavailable.

Referring once again to FIG. 12, next, the comprehensiveness verification unit 103 lists all the concretizing actions that solve the abstract element u of the abstract configuration D by each concretizing rule $r_i$ to form a list $S_u$. Further, since the information on the applied part is calculated in this processing, the comprehensiveness verification unit 103 obtains the entity $e_i$ corresponding to the abstract element u from the information on the applied part, and records the obtained entity $e_i$ (Step S1202).

Supplement

Note that "the entity $e_i$ corresponding to the abstract element u" indicates a node of $r_i$ that corresponds to the node n when the abstract element u is an "abstract node n: t" or an "unreached request n.p" and indicates an edge of $r_i$ that corresponds to an edge $n_s \rightarrow n_d$ when the abstract element u is an "abstract edge $n_s \rightarrow n_d$:t".

The next processing branches depending on whether or not "there is even a single concretizing rule that does not match the abstract configuration D" in Step S1202 (Step S1203). Here, "abstract configuration D not matching the concretizing rule R" means that "the abstract configuration D does not have a structure corresponding to the left side of the concretizing rule R".

When there is even a single concretizing rule that does not match the abstract configuration D in Step S1202 (YES in Step S1203), the comprehensiveness verification unit 103 sends (No, $S_u$) back to the concretizing policy determination unit 102 as output (Step S1207), and ends the processing.

When there is no concretizing rule that does not match the abstract configuration D in Step S1202 (NO in Step S1203), the processing in the comprehensiveness verification unit 103 proceeds to Step S1204.

Next, the comprehensiveness verification unit 103 sequentially executes Steps S1205 and S1206 on each concretizing rule included in R (Step S1204).

The comprehensiveness verification unit 103 checks, for the concretizing rule $r_i$, (1) whether the entity $e_i$ is included in the left side of the concretizing rule $r_i$ and (2) whether the left side of the concretizing rule $r_i$ is formed of only an entity that are dependent upon the entity $e_i$ (Step S1205). Note that $e_i$ is "the entity corresponding to the abstract element u" obtained in Step S1202.

Here, the relationship that "the entity $e_1$ is dependent upon $e_2$" is defined as a case in which one of the following three cases applies.

(1) $e_1$ is a node and has a component p as a request, and $e_2$ is a "WIRE: p"-type edge extending from $e_1$
(2) $e_1$ is an edge and $e_2$ is an end point (a starting point or a terminating point) thereof
(3) $e_1$ is dependent upon the entity $e_m$ and $e_m$ is dependent upon $e_2$ Supplement The left side of the concretizing rule $r_i$ being formed of only the entity that is dependent upon the entity $e_i$ corresponding to the abstract element u means that concretizing actions in which "the concretizing rule $r_i$ solves the abstract element u (so as to correspond to $e_i$)" only have patterns, regarding the left side, of the same applied part. That is, it is guaranteed, upon passing the test in Step S1205, that at least the patterns of the applied part on the left side are covered.

When it has revealed that one of the conditions (1) or (2) is not satisfied in Step S1205 (NO in Step S1205), the comprehensiveness verification unit 103 sends (No, $S_u$) back to the concretizing policy determination unit 102 as output (Step S1207), and ends the processing.

When it has revealed that both the conditions (1) and (2) are satisfied in Step S1205 (YES in Step S1205), the processing in the comprehensiveness verification unit 103 proceeds to Step S1206.

The comprehensiveness verification unit 103 refers to a list type of all the parent types of the node that exists in the right side of the concretizing rule $r_i$ and does not exist in the left side thereof, and verifies that there is no node having a type included in $TYPE_i$ in the abstract configuration D (Step S1206).

Since $TYPE_i$ is uniquely determined for the concretizing rule $r_i$, it may be obtained in advance at the time of loading of the concretizing rules and data may be stored, or may be obtained every time Step S1206 is executed.

Supplement

Regarding a child type the of a node type t, which is an element of $TYPE_i$, a node having it may be reused at the time of application of the concretizing rule That is, the abstract configuration D including a node having a t-type means that "there is a node npos that may be reused in a concretizing action by the concretizing rule $r_i$ in the future, but not now at least". Therefore, the abstract configuration D including a node having a t-type means that a concretizing action which includes a node npos as an applied part may emerge as a branch of search in the future. On the other hand, if such a node is not included, this possibility can be eliminated. Therefore, by performing the check of Step S1206, it is revealed whether all the concretizing actions are covered, including reuse of a node on the right side.

In Step S1206, the next processing is branched depending on whether or not "there is no node having a type included in $TYPE_i$ in the abstract configuration D".

When it has revealed in Step S1206 that there is a node that has a type included in $TYPE_i$ in the abstract configuration D (YES in Step S1206), the comprehensiveness verification unit 103 sends (No, $S_u$) back to the concretizing policy determination unit 102 as output (Step S1207), and ends the processing.

When it has revealed in Step S1206 that there is no node that has a type included in $TYPE_i$ in the abstract configuration D (NO in Step S1206), the processing in the comprehensiveness verification unit 103 returns to Step S1204.

When the processing of Steps S1205 and S1206 has been completed on all the concretizing rules that are included in R (YES in Step S1204), the comprehensiveness verification unit 103 sends (Yes, $S_u$) back to the concretizing policy determination unit 102 as output, and ends the processing.

Described above is the operation of the comprehensiveness verification unit 103.

Figure 14:
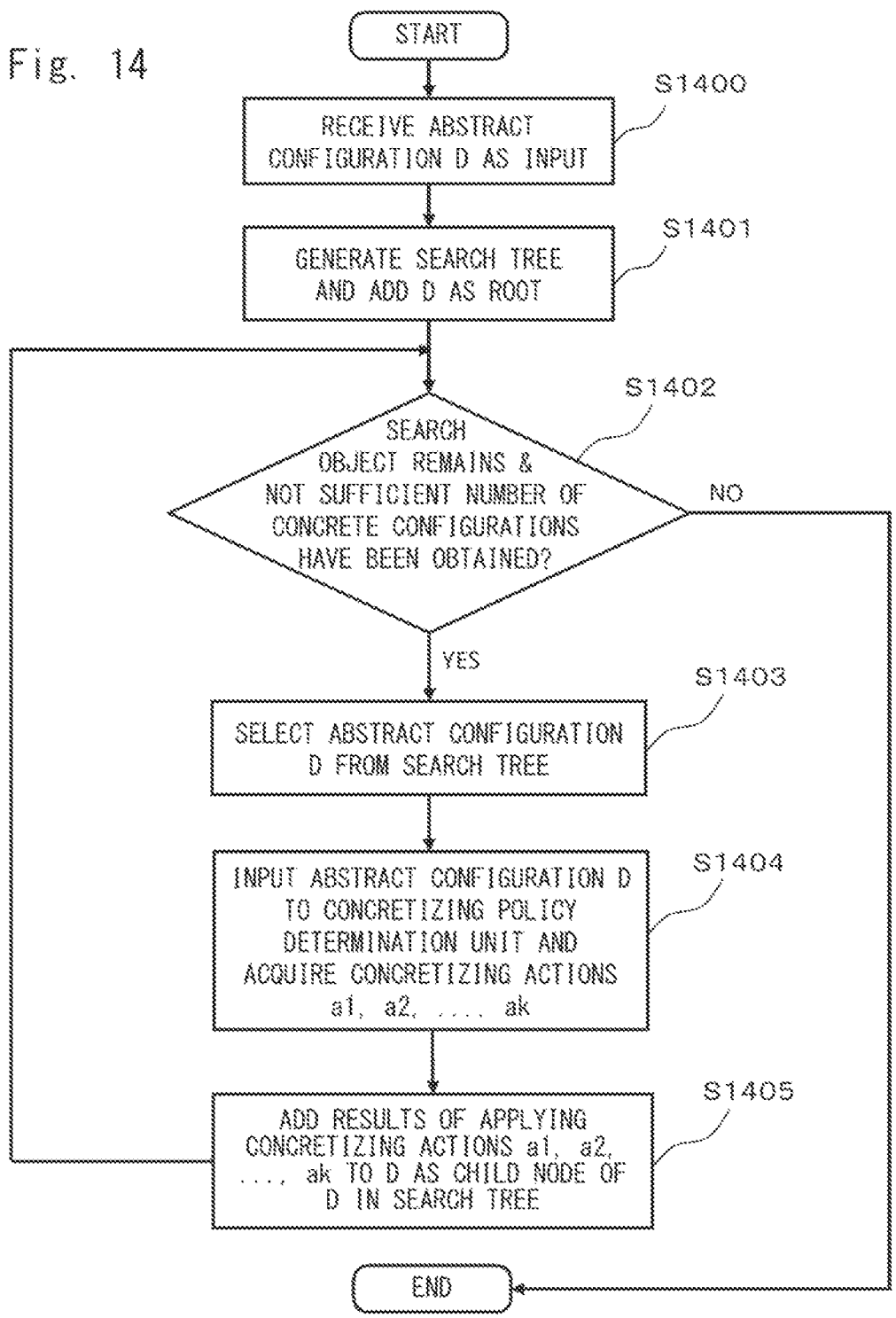
FIG. 14 is a flowchart for describing an operation example of a configuration information concretizing unit according to the first example embodiment.

Next, with reference to the drawings, an operation in which the configuration information concretizing unit 101 according to the first example embodiment designs an ICT system will be described. FIG. 14 is a flowchart showing processing in which the configuration information concretizing unit 101 according to the first example embodiment performs processing for deriving a concrete configuration of the system.

First, the configuration information concretizing unit 101 receives the abstract configuration D from an external input/output device as input (Step S1400).

Next, the configuration information concretizing unit 101 generates a search tree having the abstract configuration D received in Step S1400 as a root (Step S1401).

The configuration information concretizing unit 101 repeats the processing shown below, updates the search tree, and thus derives the concrete configuration (Step S1402).

First, the configuration information concretizing unit 101 selects, from among the abstract configurations D included in the search tree, one abstract configuration D which (1) has not been completely concretized and (2) has not been selected before in this step (Step S1403). Note that a specific method for this "selection" is not limited to specific means as long as it is selected from candidates that satisfy (1) and (2). For example, a list of candidates that satisfy (1) and (2) may be presented to the user and the user may select one of the candidates, or one of the candidates may be mechanically selected based on a specific criterion (including a complete random selection as well).

Supplement 1

In order to efficiently execute the aforementioned Step S1403, the system configuration derivation device 100 according to the first example embodiment is able to hold a data structure cand that manages a list of "abstract configurations included in the search tree that are not completely concretized and have not been selected before in this step". This data structure cand behaves as follows. (1) When an abstract configuration is added to the search tree, if this abstract configuration is not a completely concretized structure, this abstract configuration is added to cand as well. (2) In Step S1403, one abstract configuration is selected from cand, and the selected abstract configuration is deleted.

Supplement 2

The method for using the aforementioned data structure cand shows one implementation method in the configuration information concretizing unit 101 according to the first example embodiment and the method for implementing the configuration information concretizing unit 101 according to the first example embodiment is not limited thereto.

Next, the configuration information concretizing unit 101 inputs the abstract configuration D selected in Step S1403 to the concretizing policy determination unit 102 and acquires actions=a1, a2, ..., ak, which is a list of concretizing actions output from the concretizing policy determination unit 102 (Step S1404). As will be described later, all the concretizing actions acquired in Step S1404 are concretizing actions that can be applied to the abstract configuration D selected in Step S1403.

Next, the configuration information concretizing unit 101 applies each of the concretizing actions, actions=a1, a2, ..., ak, acquired in Step S1404 to the abstract configuration D selected in Step S1403 and adds all the abstract configurations obtained as a result to the search tree (Step S1405). After that, the processing in the configuration information concretizing unit 101 returns to Step S1402 where the repeated processing is started.

The configuration information concretizing unit 101 continues to perform repeating processing until a sufficient number of concrete configurations are added to the search tree or an abstract configuration that should be searched for is removed from the search tree. The aforementioned "sufficient number" is specified, for example, via an input/output device, or as a value that is incorporated in the system configuration derivation device 100 from the beginning.

After that, the configuration information concretizing unit 101 outputs a finally obtained concrete configuration to the external input/output device as a result of the processing in the system configuration derivation device 100.

Described above is the operation of the configuration information concretizing unit 101.

Figure 15:
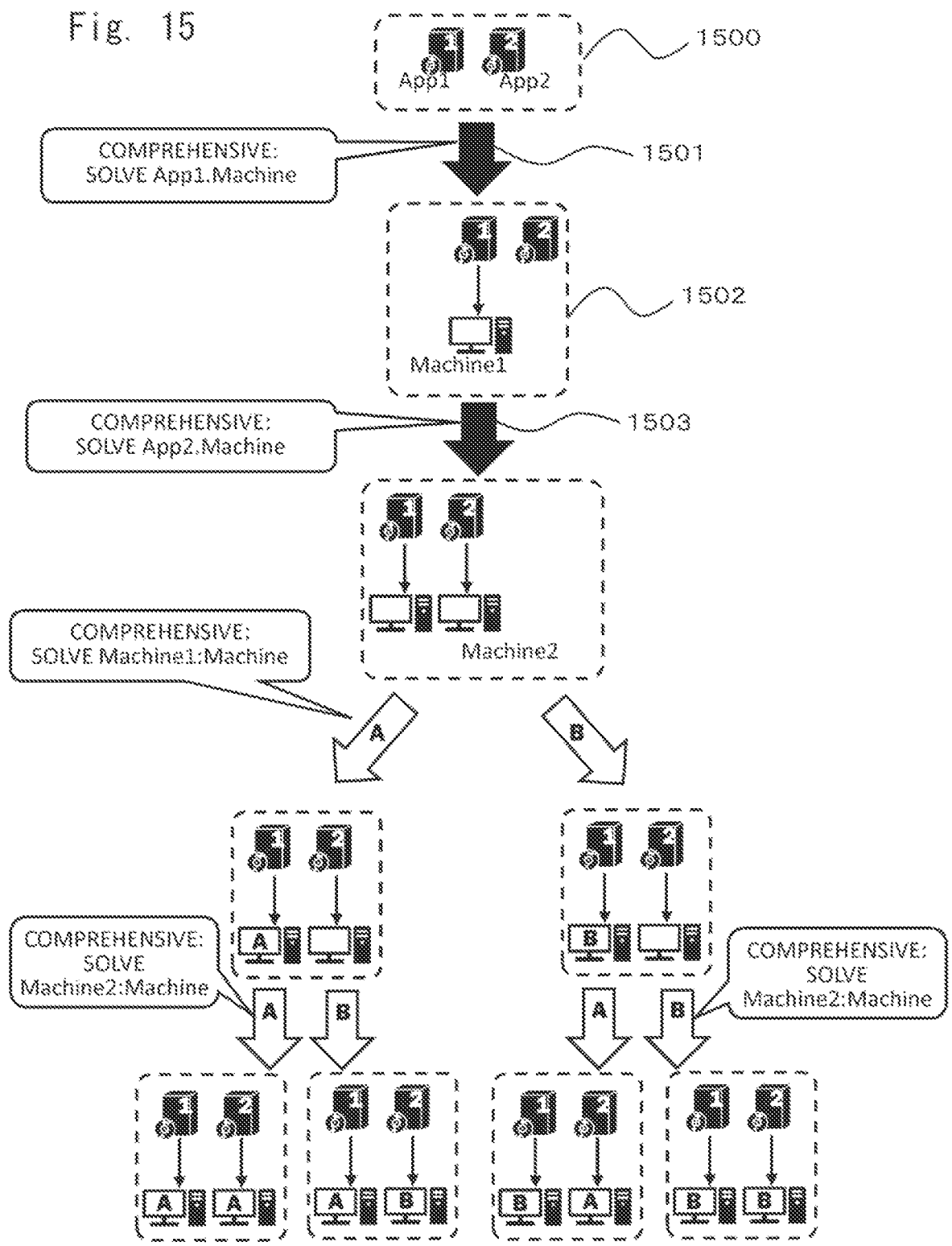
FIG. 15 is an explanatory diagram showing a specific example of search by the system configuration derivation device according to the first example embodiment.

FIG. 15 is an explanatory diagram showing a search tree generated as a result of executing the configuration information concretizing unit 101 on an abstract configuration-concretizing rule group which is the same as that in the case shown in FIG. 3. FIG. 15 shows results of continuing the search until four concrete configurations are found.

As concretizing actions that can be executed on an abstract configuration 1500, there are two variations of actions in which "APP-HOST" is applied to parts different from each other, as shown in FIG. 3. One of them is a concretizing action 1501 that solves the abstract element App1. Machine. Since this is comprehensive, the concretizing action executed on the abstract configuration 1500 is only the concretizing action 1501.

(Supplement)

Since the other concretizing action is a comprehensive concretizing action that solves an abstract element App2. Machine, this may be the only concretizing action that is executed on the abstract configuration 1500. Which one of them the concretizing policy determination unit 102 should send back in this case depends on the order in which abstract elements have been investigated in the procedure inside the concretizing policy determination unit 102 in the first example embodiment.

Further, there are three concretizing actions that can be executed on an abstract configuration 1502, as shown in FIG. 3. One of them is a concretizing action 1503 that solves the abstract element App2. Machine. Since this is a comprehensive action, a concretizing action to be executed on the abstract configuration 1502 is only the concretizing action 1503.

Likewise, in the case shown in FIG. 15, the configuration information concretizing unit 101 deploys only the minimum necessary branches at each branch. Therefore, in the case shown in FIG. 15, all the concrete configurations that may occur as a result of the concretization of the abstract configuration 1500 can be output without generating redundant paths as shown in FIG. 3.

Effects of First Example Embodiment

In the system configuration derivation device 100 according to the first example embodiment, the configuration information concretizing unit 101 receives an input configuration requirement in a form of an abstract configuration and repeatedly concretizes the abstract configuration by applying concretizing rules, thereby performing a tree search in a search tree having configuration requirements as roots and abstract configurations as nodes, and outputs configuration information of the ICT system that is finally fully concretized.

Further, at branches of the tree search, the configuration information concretizing unit 101 sends an inquiry to the concretizing policy determination unit 102. When concretizing actions that may solve the abstract element included in the abstract configuration are covered at this time, the concretizing policy determination unit 102 sends back only these concretizing actions. This number of concretizing actions is generally smaller than the number of all the concretizing actions that can be applied to the abstract configuration, but the variations of concrete configurations that are reachable by this branch limitation remain unchanged.

Accordingly, the system configuration derivation device 100 according to the first example embodiment is able to quickly find a concrete configuration that satisfies the abstract configuration including an undetermined abstract element by searching for a small search tree, whereby it is possible to efficiently find information on the ICT system that satisfies the requirement and output this information.

Second Example Embodiment

Configuration of Second Example Embodiment

Figure 16:
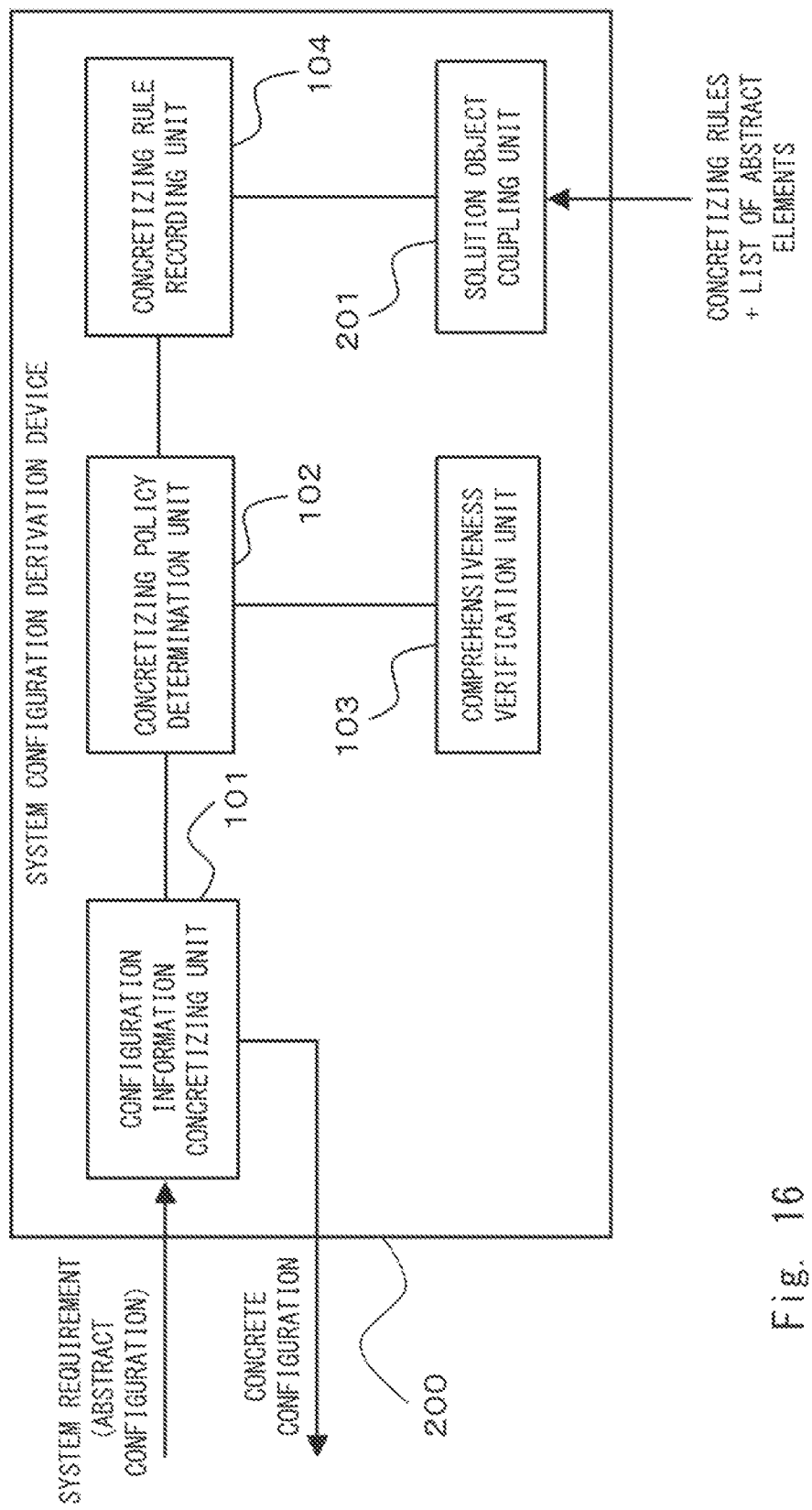
FIG. 16 is a block diagram showing a configuration example of a system configuration derivation device according to a second example embodiment.

Next, with reference to the drawings, a configuration of a second example embodiment according to the present disclosure will be described. FIG. 16 is a block diagram showing a configuration example of a system configuration derivation device 200 according to the second example embodiment.

Referring to FIG. 16, the system configuration derivation device 200 according to the second example embodiment includes a solution object coupling unit 201 in place of the solution object detection unit 105 of the system configuration derivation device 100 according to the first example embodiment described above.

Unlike the solution object detection unit 105, the solution object coupling unit 201 receives, from an external input/output device, "(a list of) abstract elements to be solved" as input, in such a way that it is correlated to concretizing rules.

Except for the aforementioned points, there is no difference between the configuration of the system configuration derivation device 200 and that of the system configuration derivation device 100.

Operation of Second Example Embodiment

As described above, the configuration of the system configuration derivation device 200 according to the second example embodiment and the configuration of the system configuration derivation device 100 are the same except for the solution object coupling unit 201. Therefore, the operation of the system configuration derivation device 200 according to the second example embodiment and the operation of the system configuration derivation device 100 are the same except for the operation in the solution object coupling unit 201.

Figure 17:
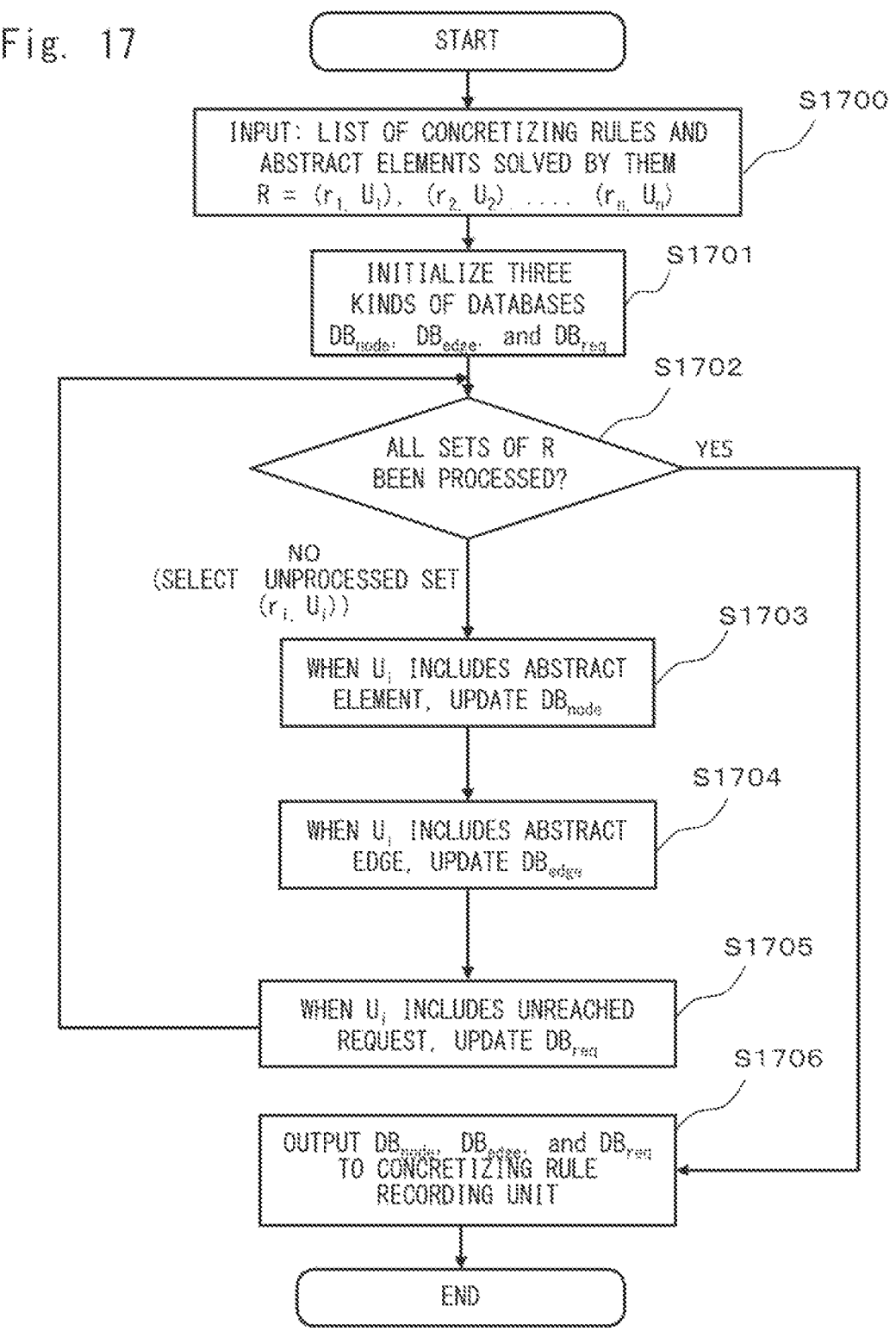
FIG. 17 is a flowchart for describing an operation example of a solution object coupling unit according to the second example embodiment.

In the following description, with reference to the drawings, only the operation of the solution object coupling unit 201 according to the second example embodiment will be described. FIG. 17 is a flowchart showing processing in which the solution object coupling unit 201 according to the second example embodiment loads concretizing rules.

Referring to FIG. 17, first, the solution object coupling unit 201 receives, from an external input/output device, a list of concretizing rules $R=r_1, \ldots, r_n$, and a list of data $U_1, \ldots, U_n$ showing abstract elements solved by each of the concretizing rules as input (Step S1700). Here, each $U_i$ (i=1, ..., n) is a list of abstract elements.

Supplement

When the solution object coupling unit 201 receives the input, it may investigate whether each concretizing rule $r_i$ actually solves each abstract element included in $U_i$. When each concretizing rule $r_i$ does not solve each abstract element included in $U_i$, an error may be issued and the loading procedure may fail.

Next, the solution object coupling unit 201 initializes three databases $DB_{node}$, $DB_{edge}$, and $DB_{req}$ (Step S1701). Here, the databases $DB_{node}$, $DB_{edge}$, and $DB_{req}$ are databases for sending a "list of concretizing rules" in response to a value, which serves as a key, and the aforementioned "initialize" refers to a state in which an empty list is sent for any key.

The solution object coupling unit 201 executes Steps S1703 to S1705 on each concretizing rule $r_i$ included in the list of concretizing rules R received as input (Step S1702).

When $U_i$ includes an "abstract node" abstract element v: t, the solution object coupling unit 201 adds, for each "abstract node" abstract element v: t included in $U_i$, the concretizing rule $r_i$ to the list $DB_{node}[t]$ obtained using t as a key, and updates the database $DB_{node}$ (Step S1703).

When $U_i$ includes an "abstract edge" abstract element $v_s \rightarrow v_d$: t, the solution object coupling unit 201 adds, for each "abstract edge" abstract element $v_s \rightarrow v_d$:t included in $U_i$, the concretizing rule $r_i$ to the list $DB_{edge}[t]$ obtained using the type t of each edge as a key, and updates the database $DB_{edge}$ (Step S1704).

When $U_i$ includes an "unreached request" abstract element v.p, the solution object coupling unit 201 adds, for each "unreached request" abstract element v.p included in $U_i$, the concretizing rule $r_i$ to the list $DB_{req}[p]$ obtained using each request component p as a key, and updates the database $DB_{req}$ (Step S1705).

After the processing is completed for all the concretizing rules that are included in R (YES in Step S1702), the solution object coupling unit 201 outputs the three databases $DB_{node}$, $DB_{edge}$, and $DB_{req}$ to the concretizing rule recording unit 104 as data for inquiry response (Step S1706), and ends the processing.

Described above is the operation in which the solution object coupling unit 201 according to the second example embodiment loads concretizing rules.

Effects of Second Example Embodiment

In the system configuration derivation device 200 according to the second example embodiment, the solution object coupling unit 201 employs an abstract element directly specified by the user via the external input/output device from a concretizing rule, unlike the solution object detection unit 105 that mechanically obtains the abstract element solved by this concretizing rule.

While the concretizing rules are basically written as data for solving an abstract element, it is possible that a concretizing rule which solves only the abstract element, which is an object of the solution, may not be obtained. The solution object detection unit 105 registers such a concretizing rule in a database as well.

It can be basically considered that each abstract element included in requirements is solved by a concretizing rule created for the purpose of solving this abstract element, thereby reaching a concrete configuration. Therefore, when an abstract element u that is not intended to be solved by a concretizing rule r is solved as a result, considering r as one of concretizing rules that can solve u may cause the pruning efficiency in the concretizing policy determination unit 102 to decrease.

In order to solve the aforementioned problem, the second example embodiment limits, by the solution object coupling unit 201, "abstract elements that can be solved by each concretizing rule" to abstract elements specified by the user, whereby it is possible to improve the pruning efficiency in the concretizing policy determination unit 102 and to finally complete the automatic design process in the system configuration derivation device 200 more efficiently.

Third Example Embodiment

Figure 18:
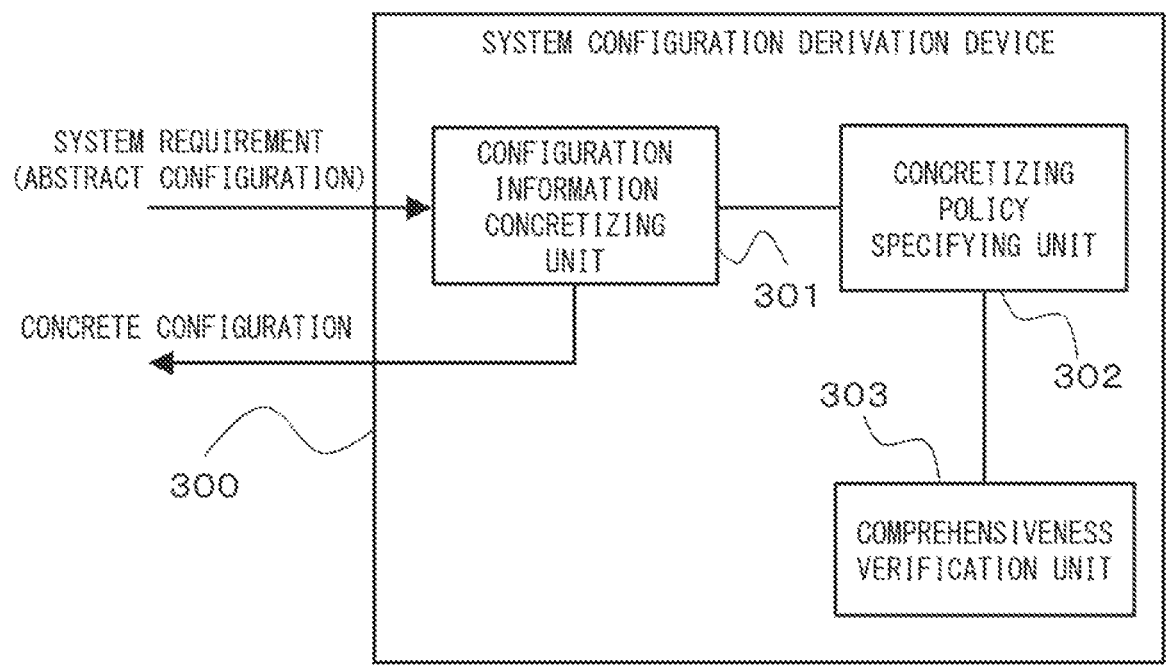
FIG. 18 is a block diagram showing a configuration example of a system configuration derivation device according to a third example embodiment.

Next, with reference to the drawings, a configuration of a third example embodiment according to the present disclosure will be described. FIG. 18 is a block diagram showing a configuration example of a system configuration derivation device 300 according to the third example embodiment. This third example embodiment corresponds to a higher concept of the aforementioned first and second example embodiments.

The system configuration derivation device 300 according to the third example embodiment is a device that derives a concretized system by repeating processing of receiving, by a graph-like data structure formed of nodes that correspond to components and edges indicating relationships among the components, an abstract configuration that expresses a configuration of a system including an undetermined abstract element as input, generating a search tree having the input abstract configuration as a root, converting the input abstract configuration into a more concrete abstract configuration by applying a concretizing rule which describes a method for removing the abstract element included in the abstract configuration, and adding the abstract configuration obtained by the conversion to the search tree.

Referring to FIG. 18, the system configuration derivation device 300 according to the third example embodiment includes a configuration information concretizing unit 301, a concretizing policy specifying unit 302, and a comprehensiveness verification unit 303. The configuration information concretizing unit 301, the concretizing policy specifying unit 302, and the comprehensiveness verification unit 303 respectively correspond to the configuration information concretizing unit 101, the concretizing policy determination unit 102, and the comprehensiveness verification unit 103.

The concretizing policy specifying unit 302 specifies a concretizing action that it is essential to apply to the input abstract configuration from among concretizing actions, which correspond to concrete conversion of the abstract configuration by the concretizing rule.

The comprehensiveness verification unit 303 verifies whether the essential concretizing action capable of removing the abstract element included in the input abstract configuration can be applied comprehensively to the input abstract configuration.

The configuration information concretizing unit 301 applies the essential concretizing action specified by the concretizing policy specifying unit 302 based on the result of the verification performed by the comprehensiveness verification unit 303, thereby converting the input abstract configuration into a more concrete abstract configuration until the abstract configuration no longer includes abstract elements.

From among the concretizing actions, which correspond to concrete conversion of the abstract configuration by the concretizing rule, a concretizing action that it is essential to apply to the input abstract configuration is specified.

In the system configuration derivation device 300 according to the third example embodiment, the configuration information concretizing unit 301 converts an input abstract configuration into a more concrete abstract configuration by applying the essential concretizing action specified by the concretizing policy specifying unit 302 based on the result of the verification performed by the comprehensiveness verification unit 303. Therefore, it is possible to reduce the number of branches in the tree search of the search tree and find a concrete configuration by searching for a small search tree. As a result, it is possible to efficiently derive the concrete configuration.

Note that the configuration information concretizing unit 301 may input, at a branch of the tree search of the search tree, an abstract configuration of a branch source to the concretizing policy specifying unit 302, and receive, from the concretizing policy specifying unit 302, a presentation of the essential concretizing action applied to the abstract configuration of the branch source.

Further, the comprehensiveness verification unit 303 may verify whether or not the essential concretizing action capable of removing the abstract element included in the input abstract configuration can be applied comprehensively to the input abstract configuration by determining, regarding the concretizing rule that can solve the input abstract element, the following (1) and (2) based on a feature of a graph indicating conditions for the concretizing rule to be applicable.

(1) Whether or not the concretizing rule can be applied to the abstract configuration in the future
(2) If the concretizing rule can be applied to the abstract configuration in the future, whether or not the concretizing rule can be readily applied to the abstract configuration by all the application methods that can solve the abstract element Further, the system configuration derivation device 300 may further include a solution object detection unit and a concretizing rule recording unit. The aforementioned solution object detection unit and the concretizing rule recording unit respectively correspond to the solution object detection unit 105 and the concretizing rule recording unit 104. The aforementioned solution object detection unit may receive a list of concretizing rules as input, detect an abstract element that can be solved by the concretizing rules included in the list, and create a database from which information on the concretizing rules can be retrieved using information on the abstract element that can be solved as a key. The aforementioned concretizing rule recording unit may receive an abstract element as input, and send the list of concretizing rules capable of solving the input abstract element based on the database. In this case, the concretizing policy specifying unit 302 may input the abstract element to the aforementioned concretizing rule recording unit and acquire the list of concretizing rules capable of solving the abstract element from the aforementioned concretizing rule recording unit. Then, the concretizing policy specifying unit 302 may input the abstract configuration, the abstract element, and the list of concretizing rules to the comprehensiveness verification unit 303, and request the verification.

Alternatively, the system configuration derivation device 300 may further include a solution object coupling unit and a concretizing rule recording unit. The aforementioned solution object coupling unit and the concretizing rule recording unit respectively correspond to the solution object coupling unit 201 and the concretizing rule recording unit 104. The aforementioned solution object coupling unit receives a list of sets of a concretizing rule and an abstract element solved by the concretizing rule as input, and create a database from which information on the concretizing rules can be retrieved using information on the abstract elements solved by the concretizing rules as a key. The aforementioned concretizing rule recording unit may receive the abstract element as input and send the list of concretizing rules capable of solving the input abstract element as a response based on the database. In this case, the concretizing policy specifying unit 302 may input the abstract element to the aforementioned concretizing rule recording unit, and acquire the list of concretizing rules capable of solving the abstract element from the aforementioned concretizing rule recording unit. Then, the concretizing policy specifying unit 302 may input the abstract configuration, the abstract element, and the list of concretizing rules to the comprehensiveness verification unit 303, and request verification.

Further, the configuration information concretizing unit 301 may repeat converting the input abstraction configuration into a more concrete abstract configuration until the abstract configuration no longer includes abstract elements.

Fourth Example Embodiment

Figure 19:
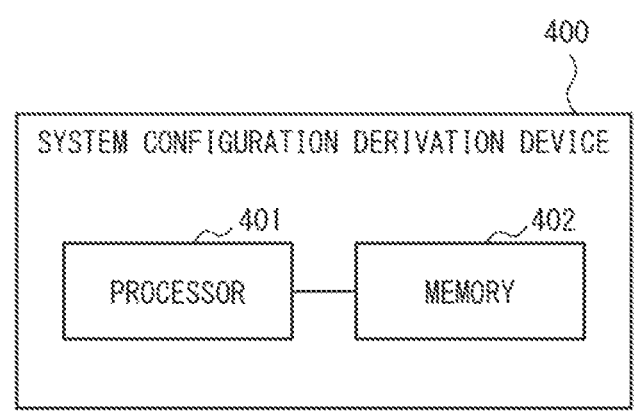
FIG. 19 is a block diagram showing an example of a hardware configuration of a system configuration derivation device according to a fourth example embodiment.

Next, with reference to the drawings, a configuration of a fourth example embodiment according to the present disclosure will be described. FIG. 19 is a block diagram showing an example of a hardware configuration of a system configuration derivation device 400 according to the fourth example embodiment.

Referring to FIG. 19, a system configuration derivation device 400 according to the fourth example embodiment includes a processor 401 and a memory 402.

The processor 401 may be, for example, a microprocessor, a Micro Processing Unit (MPU), or a Central Processing Unit (CPU). The processor 401 may include a plurality of processors.

The memory 402 is formed of a combination of a volatile memory and a non-volatile memory. The memory 402 may include a storage that is located apart from the processor 401. In this case, the processor 401 may access the memory 402 via an Input (I)/Output (O) interface that is not shown.

The system configuration derivation devices 100-300 according to the aforementioned first to third example embodiments may include a hardware configuration shown in FIG. 19. The memory 402 stores a program. This program includes instructions (or software codes) that, when loaded into a computer, cause the computer to perform one or more of the functions described in the aforementioned example embodiments. The configuration information concretizing units 101 and 301, the concretizing policy determination unit 102, the concretizing policy specifying unit 302, the comprehensiveness verification units 103 and 303, the solution object detection unit 105, and the solution object coupling unit 201 according to the aforementioned system configuration derivation devices 100-300 may be implemented by the processor 401 loading the program stored in the memory 402 and executing the loaded program. Further, the concretizing rule recording unit 104 in the aforementioned system configuration derivation devices 100-300 may be implemented by the memory 402.

Further, the aforementioned program may be stored in a non-transitory computer readable medium or a tangible storage medium. By way of example, and not a limitation, computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (registered trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

While the present disclosure has been described above with reference to the example embodiments, the present disclosure is not limited to the aforementioned example embodiments. Various changes that may be understood by one skilled in the art may be made to the configurations and the details of the present disclosure within the scope of the present disclosure.

REFERENCE SIGNS LIST 100-400 SYSTEM CONFIGURATION DERIVATION DEVICE
101, 301 CONFIGURATION INFORMATION CONCRETIZING UNIT
102 CONCRETIZING POLICY DETERMINATION UNIT
103, 303 COMPREHENSIVENESS VERIFICATION UNIT
104 CONCRETIZING RULE RECORDING UNIT
105 SOLUTION OBJECT DETECTION UNIT
201 SOLUTION OBJECT COUPLING UNIT
302 CONCRETIZING POLICY SPECIFYING UNIT
401 PROCESSOR
402 MEMORY

What is claimed is:

1. A system configuration derivation device configured to derive a concretized system by repeating processing of receiving, by a graph style data structure formed of nodes that correspond to components and edges indicating relationships among the components, an abstract configuration that expresses a configuration of a system including an undetermined abstract element as input, generating a search tree having the abstract configuration as a root, converting the abstract configuration into first level abstract configuration by applying a concretizing rule which describes a method for removing the abstract element included in the abstract configuration, and adding the abstract configuration obtained by the conversion to the search tree, the system configuration derivation device comprising:

at least one memory storing instructions, a first processor configured to execute the instructions to specify a concretizing action to the abstract configuration from among concretizing actions, which correspond to concrete conversion of the abstract configuration by the concretizing rule;

a second processor configured to execute the instructions to verify whether the concretizing action removes the abstract element included in the abstract configuration; and a third processor configured to execute the instructions to apply the concretizing action specified by the first processor based on the result of the verification performed by the second processor, and in response to the applied concretizing action, converting the abstract configuration into second level abstract configuration, wherein the second level abstract configuration does not have abstract elements, wherein the third processor is further configured to execute the instructions to optimize a computation speed and optimize a direction in which a tree search of the search tree proceeds using reinforcement learning.

2. The system configuration derivation device according to claim 1, wherein the third processor is further configured to execute the instructions to input, at a branch of the tree search of the search tree, the abstract configuration of a branch source to the first processor, and receive, from the first processor, a presentation of the concretizing action applied to the abstract configuration of the branch source.

3. The system configuration derivation device according to claim 1, wherein, regarding the concretizing rule that can solve the abstract element, the second processor is further configured to execute the instructions to determine, based on a feature of a graph indicating conditions for the concretizing rule to be applicable, (1) whether or not the concretizing rule is applied to the abstract configuration in the future and (2) if the concretizing rule is applied to the abstract configuration in the future, whether or not the concretizing rule is applied to the abstract configuration by all the application methods that solve the abstract element, verifying whether or not the concretizing action that removes the abstract element included in the abstract configuration is applied to the abstract configuration.

4. The system configuration derivation device according to claim 1, further comprising:

a fourth processor configured to execute the instructions to receive a list of the concretizing rules as input, detect an abstract element that can be solved by the concretizing rules included in the list, and create a database from which information on the concretizing rules can be retrieved using information on the abstract element that can be solved as a key; and a fifth processor configured to execute the instructions to receive the abstract element as input and send the list of concretizing rules that can solve the input abstract element as a response based on the database, wherein the first processor is further configured to execute the instructions to input the abstract element to the fifth processor and acquire the list of concretizing rules that can solve the abstract element from the fifth processor, and the first processor is further configured to execute the instructions to input the abstract configuration, the abstract element, and the list of concretizing rules to the second processor, and request the verification.

5. The system configuration derivation device according to claim 1, further comprising:

a sixth processor configured to execute the instructions to receive a list of sets of the concretizing rules and the abstract elements solved by the concretizing rules as input and create a database from which information on the concretizing rules can be retrieved using information on the abstract elements solved by the concretizing rules as a key; and a seventh processor configured to execute the instructions to receive the abstract element as input and send the list of concretizing rules that can solve the input abstract element as a response based on the database, wherein the first processor is further configured to execute the instructions to input the abstract element to the seventh processor and acquire the list of concretizing rules that can solve the abstract element from the seventh processor, and the first processor is further configured to execute the instructions to input the abstract configuration, the abstract element, and the list of concretizing rules to the second processor, and requests the verification.

6. The system configuration derivation device according to claim 1, wherein the third processor is further configured to execute the instructions to repeat the conversion of the abstract configuration into second level abstract configuration, wherein the second level abstract configuration does not have abstract elements.

7. A system configuration derivation method performed by a system configuration derivation device that derives a concretized system by repeating processing of receiving, by a graph style data structure formed of nodes that correspond to components and edges indicating relationships among the components, an abstract configuration that expresses a configuration of a system including an undetermined abstract element as input, generating a search tree having the abstract configuration as a root, converting the abstract configuration into first level abstract configuration by applying a concretizing rule which describes a method for removing the abstract element included in the abstract configuration, and adding the abstract configuration obtained by the conversion to the search tree, the system configuration derivation method comprising:

a first step of specifying a concretizing action to the abstract configuration from among concretizing actions, which correspond to concrete conversion of the abstract configuration by the concretizing rule;

a second step of verifying whether or not the concretizing action removes the abstract element included in the abstract configuration; and a third step of applying the concretizing action specified in the first step based on the result of the verification in the second step, and in response to the applied concretizing action, converting input abstract configuration into second level abstract configuration, wherein the second level abstract configuration does not have abstract elements, wherein the third step further comprises optimizing a computation speed and optimizing a direction in which a tree search of the search tree proceeds using reinforcement learning.

8. A non-transitory computer readable medium storing a program for causing a computer to derive a concretized system by repeating processing of receiving, by a graph style data structure formed of nodes that correspond to components and edges indicating relationships among the components, an abstract configuration that expresses a configuration of a system including an undetermined abstract element as input, generating a search tree having the abstract configuration as a root, converting the abstract configuration into first level abstract configuration by applying a concretizing rule which describes a method for removing the abstract element included in the abstract configuration, and adding the abstract configuration obtained by the conversion to the search tree, wherein the program comprises:
- a first procedure for specifying a concretizing action to the abstract configuration from among concretizing actions, which correspond to concrete conversion of the abstract configuration by the concretizing rule;
- a second procedure for verifying whether or not the concretizing action removes the abstract element included in the abstract configuration; and
- a third procedure for applying the concretizing action specified in the first procedure based on the result of the verification in the second procedure, and in response to the applied concretizing action, converting the abstract configuration into second level abstract configuration, wherein the second level abstract configuration does not include abstract elements, wherein the third procedure is further specified for optimizing a computation speed and optimizing a direction in which a tree search of the search tree proceeds using reinforcement learning.

* * * * *